(12) United States Patent
Wu et al.

(10) Patent No.: US 11,604,403 B2
(45) Date of Patent: Mar. 14, 2023

(54) IMAGING SYSTEM AND PROJECTION DEVICE HAVING OFF AXIS REFLECTIVE ELEMENT

(71) Applicant: Coretronic Corporation, Hsin-Chu (TW)

(72) Inventors: Wei-Ting Wu, Hsin-Chu (TW);
Hsin-Hsiang Lo, Hsin-Chu (TW);
Ching-Chuan Wei, Hsin-Chu (TW);
Chuan-Chung Chang, Hsin-Chu (TW);
Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/522,937

(22) Filed: Nov. 10, 2021

(65) Prior Publication Data

US 2022/0155666 A1    May 19, 2022

Related U.S. Application Data

(60) Provisional application No. 63/115,597, filed on Nov. 18, 2020.

(30) Foreign Application Priority Data

Jul. 19, 2021    (CN) .......................... 202110811083.2

(51) Int. Cl.
*G03B 21/28*    (2006.01)
*G02B 13/16*    (2006.01)
*G03B 21/14*    (2006.01)

(52) U.S. Cl.
CPC ............. *G03B 21/28* (2013.01); *G02B 13/16* (2013.01); *G03B 21/147* (2013.01)

(58) Field of Classification Search
CPC ........ G03B 21/28; G03B 21/147; G02B 9/64; G02B 17/08
See application file for complete search history.

(56) References Cited

U.S. PATENT DOCUMENTS

| 5,820,240 A | 10/1998 | Ohzawa |
| 6,220,712 B1 | 4/2001 | Ohzawa |
| (Continued) | | |

FOREIGN PATENT DOCUMENTS

| CN | 111208701 | 5/2020 |
| JP | 2004258218 | 9/2004 |
| (Continued) | | |

OTHER PUBLICATIONS

"Office Action of Taiwan Counterpart Application", dated Sep. 2, 2022, p. 1-p. 9.

(Continued)

*Primary Examiner* — Bao-Luan Q Le
(74) *Attorney, Agent, or Firm* — JCIPRNET

(57) ABSTRACT

An imaging system, including a light valve and a projection lens, is provided. The projection lens has a reduction side and a magnification side, and includes a lens group and a convex mirror. The light valve is configured on the reduction side. The projection lens is configured to image the beam from the light valve on a projection surface, and the projection surface is configured on the magnification side. There is an included angle between the projection surface and a light receiving surface. The lens group is configured on an optical path between the magnification side and the reduction side, and includes first to seventh lens elements sequentially arranged from the magnification side to the reduction side. The refractive powers of the first to seventh lens elements are respectively negative, negative, positive, positive, negative, positive, and positive. The convex mirror is configured on an optical path between the lens group and (Continued)

the magnification side. A projection device, including the imaging system, is also provided.

20 Claims, 19 Drawing Sheets

(56) References Cited

U.S. PATENT DOCUMENTS

| | | | |
|---|---|---|---|
| 6,450,648 B1 | 9/2002 | Ohzawa et al. | |
| 7,448,760 B2* | 11/2008 | Yamagishi | G03B 21/28 353/102 |
| 7,535,648 B2* | 5/2009 | Yoshikawa | H04N 5/74 353/101 |
| 7,553,031 B2* | 6/2009 | Hisada | G03B 21/28 353/77 |
| 7,766,488 B2* | 8/2010 | Hirata | G03B 21/28 353/77 |
| 7,780,296 B2* | 8/2010 | Hisada | G03B 21/28 353/77 |
| 7,850,313 B2* | 12/2010 | Hirata | H04N 9/317 353/77 |
| 7,857,462 B2* | 12/2010 | Hisada | G02B 13/16 353/77 |
| 7,896,507 B2* | 3/2011 | Hirata | G03B 21/147 353/77 |
| 7,914,153 B2* | 3/2011 | Hirata | G03B 21/28 353/77 |
| 8,002,417 B2* | 8/2011 | Hisada | G03B 21/28 359/813 |
| 8,002,418 B2* | 8/2011 | Hirata | H04N 9/317 359/813 |
| 8,020,999 B2* | 9/2011 | Hirata | G03B 21/28 353/77 |
| 8,113,663 B2* | 2/2012 | Hisada | G02B 17/0816 353/50 |
| 8,182,097 B2* | 5/2012 | Hirata | G03B 21/28 359/813 |
| 8,337,024 B2* | 12/2012 | Kuwata | G03B 21/10 359/728 |
| 8,403,504 B2* | 3/2013 | Hirata | G03B 21/147 359/449 |
| 8,408,717 B2* | 4/2013 | Hirata | G02B 17/0852 359/813 |
| 8,573,787 B2* | 11/2013 | Hirata | G03B 21/147 359/449 |
| 8,992,025 B2* | 3/2015 | Piehler | G02B 17/0615 353/78 |
| 9,022,581 B2* | 5/2015 | Hirata | G02B 17/0852 353/98 |
| 9,581,888 B2* | 2/2017 | Piehler | G02B 17/0605 |
| 10,890,833 B2* | 1/2021 | Hirata | G02B 17/08 |
| 2006/0092385 A1 | 5/2006 | Hisada et al. | |
| 2006/0132723 A1* | 6/2006 | Yamagishi | G03B 21/28 348/E5.139 |
| 2006/0227299 A1* | 10/2006 | Hisada | G03B 21/10 353/77 |
| 2007/0291236 A1* | 12/2007 | Hirata | G03B 21/145 353/77 |
| 2008/0204673 A1* | 8/2008 | Hirata | G03B 21/147 353/99 |
| 2008/0212038 A1* | 9/2008 | Hirata | G03B 21/10 353/70 |
| 2009/0021703 A1 | 1/2009 | Takaura et al. | |
| 2009/0059185 A1* | 3/2009 | Hisada | G02B 17/0852 353/98 |
| 2009/0103060 A1* | 4/2009 | Hirata | H04N 9/3155 353/122 |
| 2009/0115975 A1* | 5/2009 | Ogura | G03B 21/30 353/98 |
| 2009/0237621 A1* | 9/2009 | Hisada | G03B 21/28 353/70 |
| 2009/0290133 A1* | 11/2009 | Yoshikawa | G02B 17/0852 353/70 |
| 2010/0238416 A1* | 9/2010 | Kuwata | G03B 21/28 359/728 |
| 2010/0265470 A1* | 10/2010 | Hirata | G03B 21/145 353/70 |
| 2010/0265474 A1* | 10/2010 | Hirata | H04N 9/317 353/98 |
| 2010/0277703 A1* | 11/2010 | Hisada | G03B 21/28 353/98 |
| 2010/0283976 A1* | 11/2010 | Hisada | G03B 21/28 353/70 |
| 2011/0025991 A1* | 2/2011 | Hirata | G03B 21/28 353/99 |
| 2011/0075113 A1* | 3/2011 | Hirata | G02B 17/0852 353/70 |
| 2011/0205499 A1* | 8/2011 | Yoshikawa | G02B 17/0852 353/37 |
| 2012/0249978 A1 | 10/2012 | Morikuni | |
| 2015/0160544 A1* | 6/2015 | Piehler | G02B 17/0816 353/98 |

FOREIGN PATENT DOCUMENTS

| | | |
|---|---|---|
| JP | 2012014127 | 1/2012 |
| JP | 2013025269 | 2/2013 |
| TW | 436661 | 5/2001 |
| TW | 201011339 | 3/2010 |
| TW | 201214008 | 4/2012 |

OTHER PUBLICATIONS

"Search Report of Europe Counterpart Application", dated Apr. 25, 2022, p. 1-p. 7.

* cited by examiner

IMAGING SYSTEM AND PROJECTION DEVICE HAVING OFF AXIS REFLECTIVE ELEMENT

CROSS-REFERENCE TO RELATED APPLICATION

This application claims the priority benefit of U.S. Provisional Application No. 63/115,597, filed on Nov. 18, 2020 and China Application No. 202110811083.2, filed on Jul. 19, 2021. The entirety of each of the above-mentioned patent applications is hereby incorporated by reference herein and made a part of this specification.

BACKGROUND

Technical Field

The disclosure relates to an optical system and an optical device, and particularly relates to an imaging system and a projection device.

Description of Related Art

The projector has been widely applied to home appliances, office equipment, game consoles, etc. The requirements for the projector are gradually developing toward lightness, thinness, shortness, and smallness. For example, compared to the projector using the traditional light source, the pocket projector using the light emitting diode is small in size and light in weight, which can reduce space requirements and is easy to carry.

In practical applications, in order to reduce the usage space of the projector, the mechanism of the projector needs to be modified to change the traditional vertical projection to the oblique projection, so that a projection image may be deflected through a mirror, and the deflected projection image may be projected onto a projection surface (for example, a desktop, the ground, a wall, a screen, etc.) according to requirements. In the oblique projection architecture, the reference ray of emergent light of the projector cannot be perpendicular to the projection surface, that is, oblique incidence, which causes trapezoidal distortion of the projection image. Traditionally, in order to reduce the trapezoidal distortion, software may be used to crop a distorted region of the projection image, thereby achieving a distortion-free situation. However, such software correction manner results in reduction in resolution and loss of brightness. In addition, another manner to reduce trapezoidal distortion is hardware correction, that is, to move the projection lens. However, such method causes the projector to become larger in size.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an imaging system, which can reduce the phenomenon of trapezoidal distortion.

The disclosure provides a projection device, which can reduce the phenomenon of trapezoidal distortion.

The other objectives and advantages of the disclosure may be further understood from the technical features disclosed in the disclosure.

In order to achieve one, a part, or all of the above objectives or other objectives, an embodiment of the disclosure provides an imaging system. The imaging system of the disclosure includes a light valve and a projection lens. The light valve is configured to provide an image beam. The projection lens is configured to image the image beam from the light valve on a projection surface, and there is an included angle between the projection surface and a light receiving surface of the light valve. The projection lens is configured on a transmission path of the image beam and has a reduction side and a magnification side. The light valve is configured on the reduction side of the projection lens. The projection surface is configured on the magnification side of the projection lens. The projection lens includes a lens group and a convex mirror. The lens group is configured on an optical path between the magnification side and the reduction side, and includes a first lens element, a second lens element, a third lens element, a fourth lens element, a fifth lens element, a sixth lens element, and a seventh lens element sequentially arranged from the magnification side to the reduction side. The refractive powers of the first lens element, the second lens element, the third lens element, the fourth lens element, the fifth lens element, the sixth lens element, and the seventh lens element are respectively negative, negative, positive, positive, negative, positive, and positive. At least one of the third lens element and the fourth lens element is a freeform surface lens element. The convex mirror is configured on an optical path between the lens group and the magnification side. Each of the first lens element, the second lens element, the third lens element, the fourth lens element, the fifth lens element, the sixth lens element, and the seventh lens element has a first surface facing the convex mirror and a second surface facing the light valve.

In order to achieve one, a part, or all of the above objectives or other objectives, another embodiment of the disclosure provides a projection device. The projection device of the disclosure includes the imaging system and an illumination system. The illumination system is configured to provide an illumination beam. The imaging system is configured on a transmission path of the illumination beam. The light receiving surface of the light valve of the imaging system is configured to receive the illumination beam, and the light valve of the imaging system is configured to convert the illumination beam into the image beam.

Based on the above, in the projection device and the imaging system thereof of an embodiment of the disclosure, at least one of the third lens element and the fourth lens element of the projection lens is the freeform surface lens element. In this way, the projection lens itself can reduce the phenomenon of trapezoidal distortion without using software to correct trapezoidal distortion and losing the brightness and resolution of the projection image.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
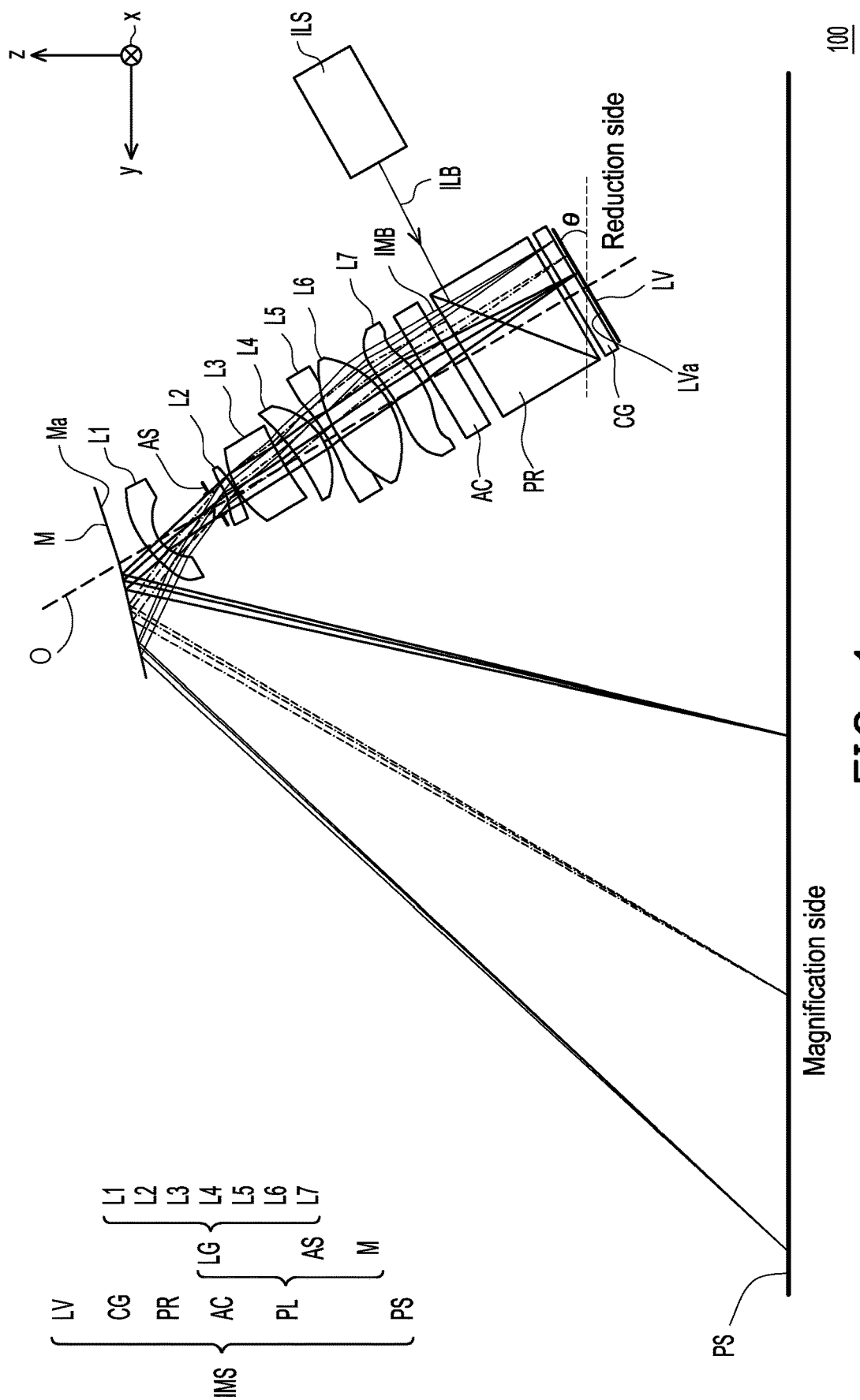
FIG. 1 is a side schematic diagram of a projection device according to an embodiment of the disclosure.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

Figure 2:
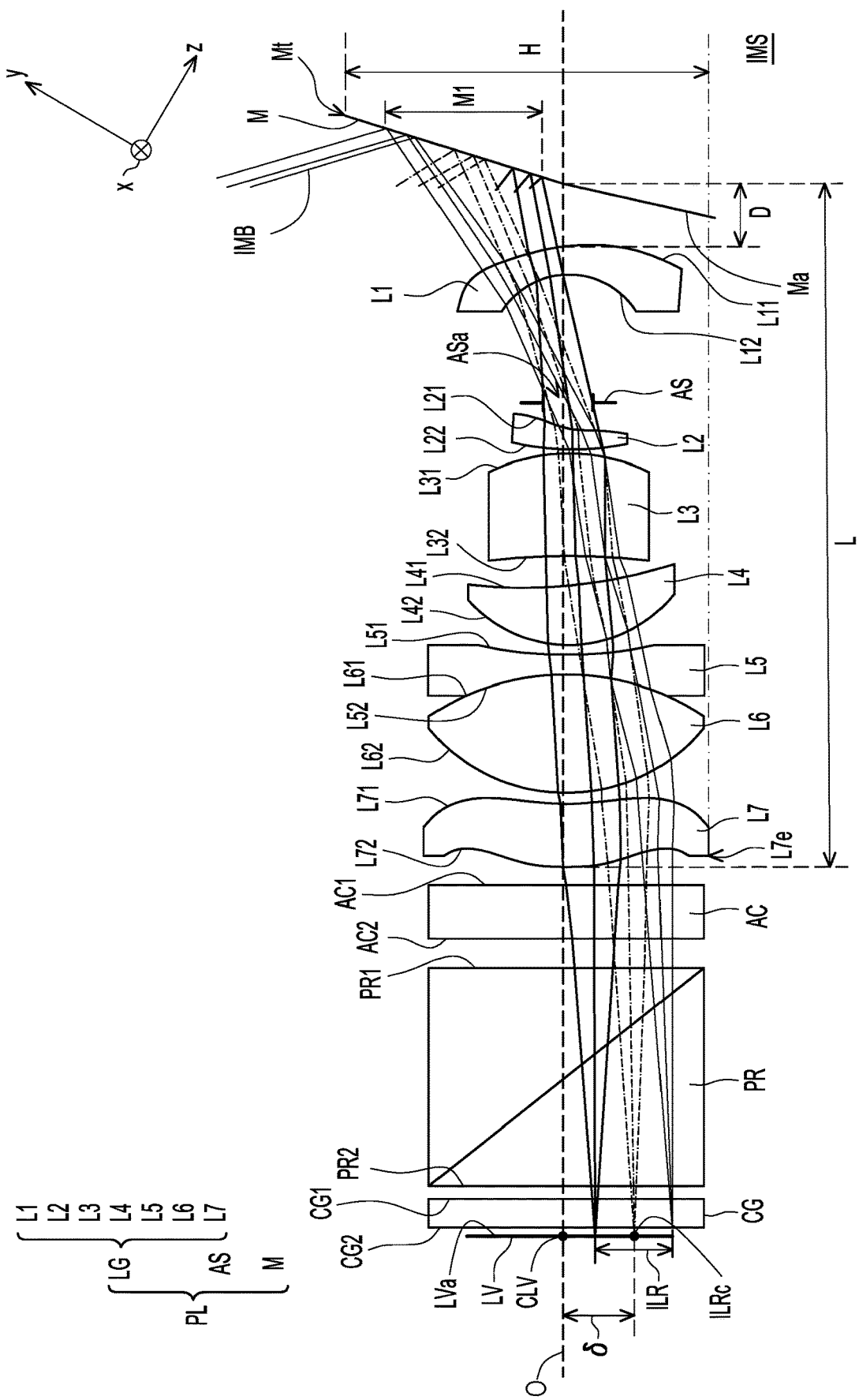
FIG. 2 is an enlarged side schematic diagram of an imaging system of the projection device of FIG. 1.

FIG. 1 is a side schematic diagram of a projection device according to an embodiment of the disclosure. FIG. 2 is an enlarged side schematic diagram of an imaging system of the projection device of FIG. 1. In order to clearly illustrate a projection lens PL, FIG. 2 omits a projection surface PS of an imaging system IMS of FIG. 1.

Please refer to FIG. 1 and FIG. 2. In the figures, a direction z is, for example, a direction perpendicular to the projection surface PS, a direction y is, for example, a direction parallel to the projection surface PS, and a direction x is, for example, a direction parallel to the projection surface PS and perpendicular to the direction y.

Please refer to FIG. 1. The projection device 100 includes an illumination system ILS and the imaging system IMS. The illumination system ILS is configured to provide an illumination beam ILB. The imaging system IMS is configured on a transmission path of the illumination beam ILB. The imaging system IMS includes a light valve LV, the projection lens PL, and the projection surface PS. The projection lens PL has a reduction side and a magnification side. The light valve LV is configured on the reduction side of the projection lens PL. The projection surface PS is configured on the magnification side of the projection lens PL. A light receiving surface LVa of the light valve LV is configured to receive the illumination beam ILB provided by the illumination system ILS, and the light valve LV is configured to convert the illumination beam ILB into an image beam IMB. The projection lens PL is configured on a transmission path of the image beam IMB and is configured to image the image beam IMB from the light valve LV on the projection surface PS located on the magnification side. In particular, there is an included angle θ between the projection surface PS and the light receiving surface LVa of the light valve LV. In other words, the projection device 100 is an oblique projection device.

The included angle θ between the projection surface PS and the light receiving surface LVa of the light valve LV satisfies: 0°<θ<90°. For example, in the embodiment, the included angle θ may satisfy: 25°<θ<90°, but the disclosure is not limited thereto.

The projection surface PS generally refers to an object surface on which a projection image may be formed. For example, in the embodiment, the projection surface PS may be a desktop. However, the disclosure is not limited thereto. In other embodiments, the projection surface PS may also be the ground, a wall, a screen, etc.

In the embodiment, the light valve LV may be a reflective optical modulator, such as a digital micro-mirror device and a liquid-crystal-on-silicon panel (LCOS panel). However, the disclosure is not limited thereto. In other embodiments, the light valve LV may also be a transmissive optical modulator, such as a transparent liquid crystal panel, an electro-optical modulator, a magneto-optical modulator, and an acousto-optical modulator (AOM).

In the embodiment, the imaging system IMS may also optionally include a light combining element PR. The illumination system ILS transmits the illumination beam ILB to the light combining element PR. The illumination beam ILB is transmitted to the light valve LV via the light combining element PR. The light valve LV reflects the illumination beam ILB into the image beam IMB. The image beam IMB is transmitted to the projection lens PL via the light combining element PR. For example, in the embodiment, the light combining element PR may be a total internal reflection prism (TIR prism). However, the disclosure is not limited thereto. In other embodiments, the light combining element PR may also be a beam splitter, a polarizer beam splitter, a field lens, or other optical elements, depending on the light splitting or light guiding design required by the projection device 100, which is not limited by the disclosure.

In the embodiment, the imaging system IMS may also optionally include a protection cap CG, which is disposed on the light receiving surface LVa of the light valve LV and is located between the light valve LV and the light combining element PR. The protection cap CG is configured to protect the light valve LV. In the embodiment, the material of the protection cap CG is, for example, glass, but the disclosure is not limited thereto.

In the embodiment, the imaging system IMS may also optionally include an actuator AC. The actuator AC may have a flat glass and adopt an oscillation technology for the flat glass to quickly oscillate back and forth, and is configured to improve the quality of the projection image of the projection device 100.

In the embodiment, the light valve LV and the projection lens PL may be a telecentric system to reduce the influence of the optical elements (for example, the light combining element PR, the actuator AC, etc.) configured between the light valve LV and the projection lens PL on an optical path of the image beam IMB, but the disclosure is not limited thereto.

The projection lens PL includes a lens group LG and a convex mirror M. The lens group LG is configured on an optical path between the magnification side and the reduction side. The convex mirror M is configured on an optical path between the lens group LG and the magnification side. The convex mirror M has a reflective surface Ma. The reflective surface Ma is convex. The refractive power of the convex mirror M is negative. For example, in the embodiment, the reflective surface Ma of the mirror M may be aspherical, but the disclosure is not limited thereto.

Please refer to FIG. 1 and FIG. 2. The lens group LG includes a first lens element L1, a second lens element L2, a third lens element L3, a fourth lens element L4, a fifth lens element L5, a sixth lens element L6, and a seventh lens element L7 sequentially arranged from the magnification side to the reduction side. The refractive power of the overall lens group LG is negative. The refractive powers of the first lens element L1, the second lens element L2, the third lens element L3, the fourth lens element L4, the fifth lens element L5, the sixth lens element L6, and the seventh lens element L7 are respectively negative, negative, positive, positive, negative, positive, and positive. The first lens element L1 has a first surface L11 (marked in FIG. 2) facing the convex mirror M and a second surface L12 (marked in FIG. 2) facing the light valve LV. The second lens element L2 has a first surface L21 (marked in FIG. 2) facing the convex mirror M and a second surface L22 (marked in FIG. 2) facing the light valve LV. The third lens element L3 has a first surface L31 (marked in FIG. 2) facing the convex mirror M and a second surface L32 (marked in FIG. 2) facing the light valve LV. The fourth lens element L4 has a first surface L41 (marked in FIG. 2) facing the convex mirror M and a second surface L42 (marked in FIG. 2) facing the light valve LV. The fifth lens element L5 has a first surface L51 (marked in FIG. 2) facing the convex mirror M and a second surface L52 (marked in FIG. 2) facing the light valve LV. The sixth lens element L6 has a first surface L61 (marked in FIG. 2) facing the convex mirror M and a second surface L62 (marked in FIG. 2) facing the light valve LV. The seventh lens element L7 has a first surface L71 (marked in FIG. 2) facing the convex mirror M and a second surface L72 (marked in FIG. 2) facing the light valve LV. In the embodiment, the projection lens PL further includes an aperture stop AS, which is configured between the first lens element L1 and the second lens element L2.

It is worth noting that at least one of the third lens element L3 and the fourth lens element L4 is a freeform surface lens element. In this way, the projection lens PL can reduce the phenomenon of trapezoidal distortion.

In the embodiment, the third lens element L3 may be a freeform surface lens element. For example, in the embodiment, the first surface L31 of the third lens element L3 facing the convex mirror M may be a freeform surface. However, the disclosure is not limited thereto. In other embodiments, the freeform surface may also be designed on the second surface L32 of the third lens element L3.

In the embodiment, the fourth lens element L4 may also be a freeform surface lens element. For example, in the embodiment, the first surface L41 of the fourth lens element L4 facing the convex mirror M may be a freeform surface. However, the disclosure is not limited thereto. In other embodiments, the freeform surface may also be designed on the second surface L42 of the fourth lens element L4.

In the embodiment, the third lens element L3 and the fourth lens element L4 are both freeform surface lens elements. However, the disclosure is not limited thereto. In another embodiment, the third lens element L3 may be a freeform surface lens element, and the fourth lens element L4 may not be a freeform surface lens element. In yet another embodiment, the fourth lens element L4 may be a freeform surface lens element, and the third lens element L3 may not be a freeform surface lens element.

Figure 3:
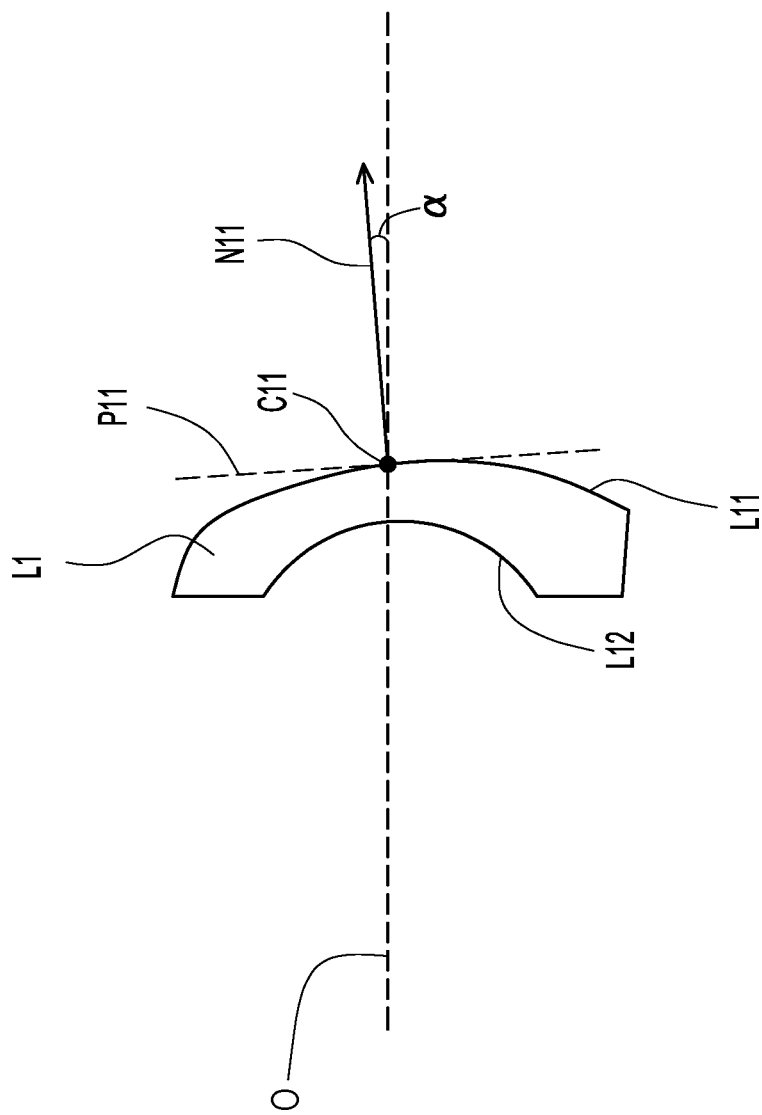
FIG. 3 is an enlarged side schematic diagram of a first lens element of FIG. 2.

FIG. 3 is an enlarged side schematic diagram of the first lens element of FIG. 2. Please refer to FIG. 2 and FIG. 3. In the embodiment, one of the first surface L11 and the second surface L12 of the first lens element L1 intersects with an optical axis O of the lens group LG at a first intersection point C11. A first tangent plane P11 passes through the first intersection point C11 and is tangent to one of the first surface L11 and the second surface L12 of the first lens element L1. There is an included angle α between a first normal vector N11 of the first tangent plane P11 and the optical axis O of the lens group LG.

Figure 4:
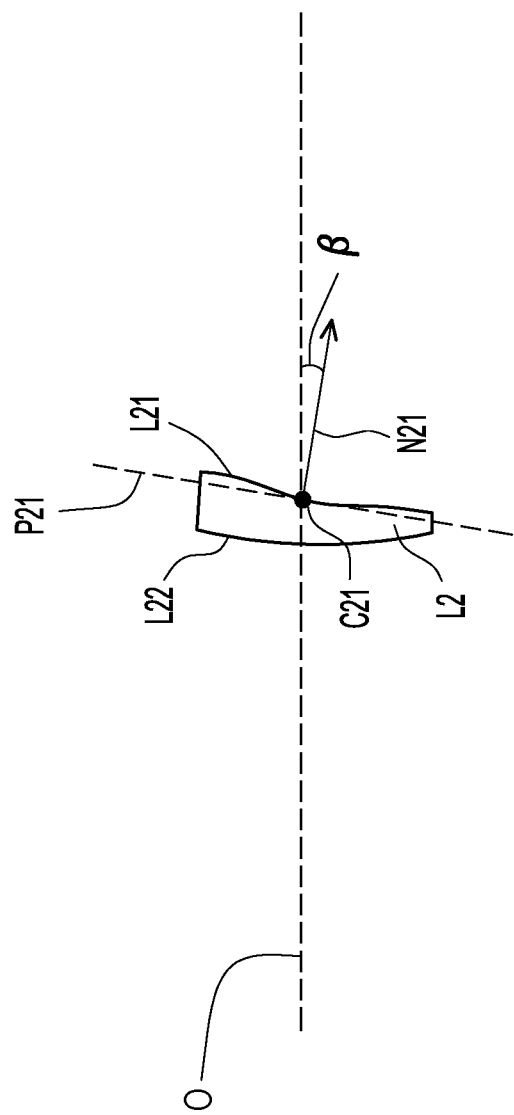
FIG. 4 is an enlarged side schematic diagram of a second lens element of FIG. 2.

FIG. 4 is an enlarged side schematic diagram of the second lens element of FIG. 2. Please refer to FIG. 2 and FIG. 4. One of the first surface L21 and the second surface L22 of the second lens element L2 intersects with the optical axis O of the lens group LG at a second intersection point C21. A second tangent plane P21 passes through the second intersection point C21 and is tangent to one of the first surface L21 and the second surface L22 of the second lens element L2. There is an included angle β between a second normal vector N21 of the second tangent plane P21 and the optical axis O of the lens group LG.

Figure 5:
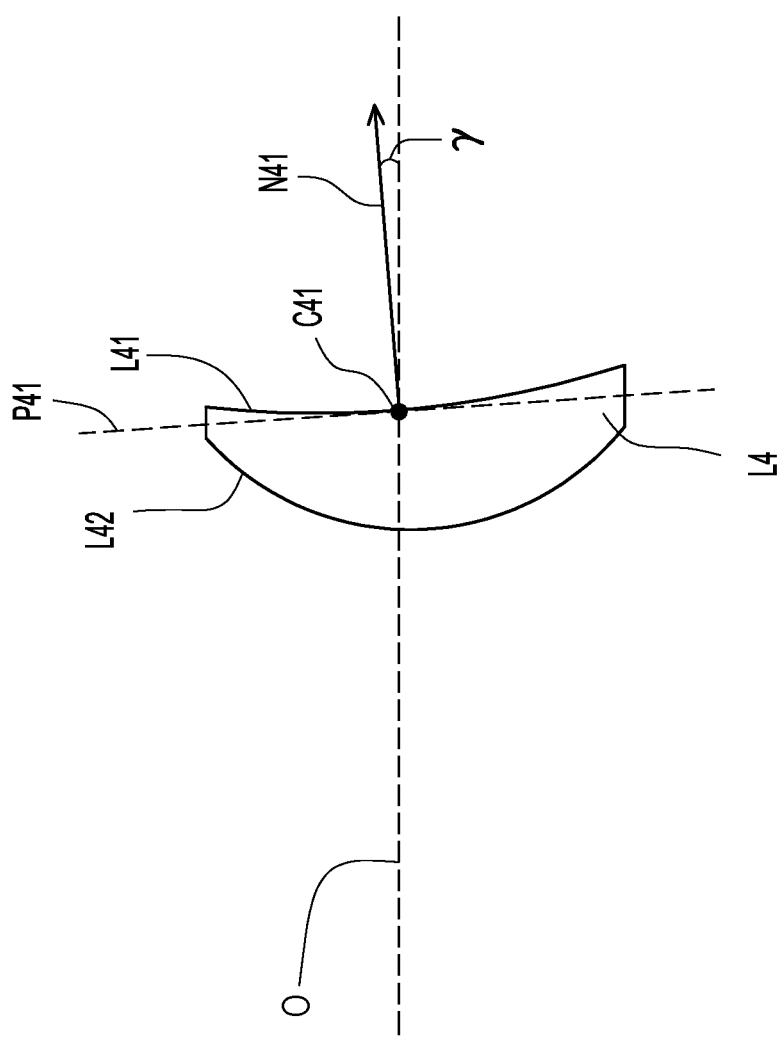
FIG. 5 is an enlarged side schematic diagram of a fourth lens element of FIG. 2.

FIG. 5 is an enlarged side schematic diagram of the fourth lens element of FIG. 2. Please refer to FIG. 2 and FIG. 5. One of the first surface L41 and the second surface L42 of the fourth lens element L4 intersects with the optical axis O of the lens group LG at a third intersection point C41. A third tangent plane P41 passes through the third intersection point C41 and is tangent to one of the first surface L41 and the second surface L42 of the fourth lens element L4. There is an included angle γ between a third normal vector N41 of the third tangent plane P41 and the optical axis O of the lens group LG.

Please refer to FIG. 2, FIG. 3, FIG. 4, and FIG. 5. In the embodiment, at least two of the included angle α, the included angle β, and the included angle γ are not 0°, one of the at least two is a positive angle, the other one of the at least two is a negative angle, and the absolute values of the positive angle and the negative angle are respectively greater than 0° and less than or equal to 20°. In other words, at least two of a surface of the first lens element L1, a surface of the second lens element L2, and a surface of the fourth lens element L4 are inclined relative to the optical axis O of the lens group LG, the inclination directions of the at least two are opposite, the absolute values of the inclination angles of the at least two are greater than 0° and less than or equal to 20°. In this way, the projection lens PL can further reduce the phenomenon of trapezoidal distortion.

Please refer to FIG. 2, FIG. 3, and FIG. 4. For example, in the embodiment, a surface of the first lens element L1 and a surface of the second lens element L2 are inclined relative to the optical axis O, the inclination directions of the surface of the first lens element L1 and the surface of the second lens element L2 are opposite, and the absolute values of the inclination angles of the surface of the first lens element L1 and the surface of the second lens element L2 are greater than 0° and less than or equal to 20°.

Please refer to FIG. 2 and FIG. 3. Specifically, in the embodiment, the first normal vector N11 of the first tangent plane P11 is inclined relative to the optical axis O of the lens group LG, that is, the first surface L11 of the first lens element L1 is inclined relative to the optical axis O. In the embodiment, the first surface L11 of the first lens element L1 is inclined away from the convex mirror M, so that the first normal vector N11 points above the optical axis O and the inclination angle (that is, the included angle α) of the first surface L11 of the first lens element L1 is a positive angle, where $|α|≤20°$. Please refer to FIG. 2 and FIG. 4. The second normal vector N21 of the second tangent plane P21 is inclined relative to the optical axis O of the lens group LG, that is, the first surface L21 of the second lens element L2 is inclined relative to the optical axis O. In the embodiment, the first surface L21 of the second lens element L2 is inclined toward the convex mirror M, so that the second normal vector N21 points below the optical axis O and the inclination angle (that is, the included angle β) of the first surface L21 of the second lens element L2 is a negative angle, where $|β|≤20°$.

Please refer to FIG. 2, FIG. 4, and FIG. 5. For example, in the embodiment, a surface of the fourth lens element L4 and a surface of the second lens element L2 are inclined relative to the optical axis O, the inclination directions of the surface of the fourth lens element L4 and the surface of the second lens element L2 are opposite, and the absolute values of the inclination angles of the surface of the fourth lens element L4 and the surface of the second lens element L2 are greater than 0° and less than or equal to 20°.

Please refer to FIG. 2 and FIG. 5. Specifically, in the embodiment, the third normal vector N41 of the third tangent plane P41 is inclined relative to the optical axis O of the lens group LG, that is, the first surface L41 of the fourth lens element L4 is inclined relative to the optical axis O. In the embodiment, the first surface L41 of the fourth lens element L4 is inclined away from the convex mirror M, so that the third normal vector N41 points above the optical axis O and the inclination angle (that is, the included angle γ) of the first surface L41 of the fourth lens element L4 is a positive angle, where $|γ|≤20°$. Please refer to FIG. 2 and FIG. 4. The first surface L21 of the second lens element L2 is inclined relative to the optical axis O. The first surface L21 of the second lens element L2 is inclined toward the convex mirror M, so that the second normal vector N21 points below the optical axis O and the inclination angle (that is, the included angle β) of the first surface L21 of the second lens element L2 is a negative angle, where $|β|≤20°$.

Please refer to FIGS. 1 and 2, the light receiving surface LVa of the light valve LV is configured to receive the illumination beam ILB, and the illumination beam ILB forms an illumination range ILR (marked in FIG. 2) on the light receiving surface LVa of the light valve LV. In particular, in the embodiment, there is a fourth intersection point CLV (marked in FIG. 2) between the light receiving surface LVa of the light valve LV and the optical axis O of the lens group LG, and there is an offset δ (marked in FIG. 2) between a center ILRc of the illumination range ILR and the fourth intersection point CLV (marked in FIG. 2). In other words, the projection device 10 of the embodiment adopts an offset design, so that a distance D between the first surface L11 of the first lens element L1 and the reflective surface Ma of the convex mirror M on the optical axis O may be shortened. In addition, configuring the aperture stop AS as close as possible to the first lens element L1 (for example, configuring the aperture stop AS between the first lens element L1 and the second lens element L2) also helps to shorten the distance D.

Please refer to FIG. 1 and FIG. 2. If a plane mirror is used to replace the convex mirror M to deflect the image beam IMB, the image beam IMB may be easily reflected back to the projection lens PL by the plane mirror to cause interference. In order to avoid interference, the distance between the plane mirror and the first surface L11 of the first lens element L1 on the optical axis O must be increased, such that a length L of the projection lens PL cannot be reduced. The projection device 100 of the embodiment uses the convex mirror M to deflect the image beam IMB to the projection surface PS. The convex mirror M has a negative refractive power. The image beam IMB is not easily reflected back to the lens group LG to cause interference after being reflected by the convex mirror M. As such, the distance D between the convex mirror M and the first surface L11 of the first lens element L1 on the optical axis O may be reduced, thereby reducing the length L of the projection lens PL. The length L of the projection lens PL refers to the distance between the reflective surface Ma of the convex mirror M and the second surface L72 of the seventh lens element L7 on the optical axis O. For example, in the embodiment, the length L of the projection lens PL may be less than 42 mm.

In the embodiment, the reflective surface Ma of the convex mirror M has a curvature radius R. The curvature radius R may satisfy: 50 mm<R<110 mm. As such, the size of the convex mirror M may be reduced to reduce the space occupied by the projection lens PL. In addition, in the embodiment, an optical effective diameter M1 of the convex mirror M and the height of the illumination range ILR in a direction perpendicular to the optical axis O (also referred to as an image source height) may satisfy: 2<(M1/the height of ILR in the direction perpendicular to the optical axis O)<3.

If the distance D between the convex mirror M and the first surface L11 of the first lens element L1 on the optical axis O is too large, the speckle on the reflective surface Ma of the convex mirror M will be too large, which is not conducive to reducing the space occupied by the projection lens PL. Conversely, if the distance D between the convex mirror M and the first surface L11 of the first lens element L1 on the optical axis O is too small, the image beam IMB will be easily reflected back to the projection lens PL by the convex mirror M to cause interference. On the premise that the image beam IMB will not be reflected back to the lens group LG by the convex mirror M, in the embodiment, the distance D between the first surface L11 of the first lens element L1 and the reflective surface Ma of the convex mirror M on the optical axis O may satisfy: 1.5 mm<D<5 mm.

In the embodiment, in the caser where the curvature radius R of the reflective surface Ma of the convex mirror M satisfies: 50 mm<R<110 mm, and the distance D between the first surface L11 of the first lens element L1 and the reflective surface Ma of the convex mirror M on the optical axis O satisfies: 1.5 mm<D<5 mm, a maximum height H of the projection lens PL may be less than 13.5 mm. An edge of a lens element with the largest diameter (for example, an edge L7e of the seventh lens element L7) in the lens group LG and an end point Mt of the convex mirror M are respectively located on two sides of the optical axis O. The maximum height H of the projection lens PL may refer to the distance between the edge of the lens element with the largest diameter (for example: the edge L7e of the seventh lens element L7) in the lens group LG and the end point Mt of the convex mirror M in the direction perpendicular to the optical axis O.

Figure 6:
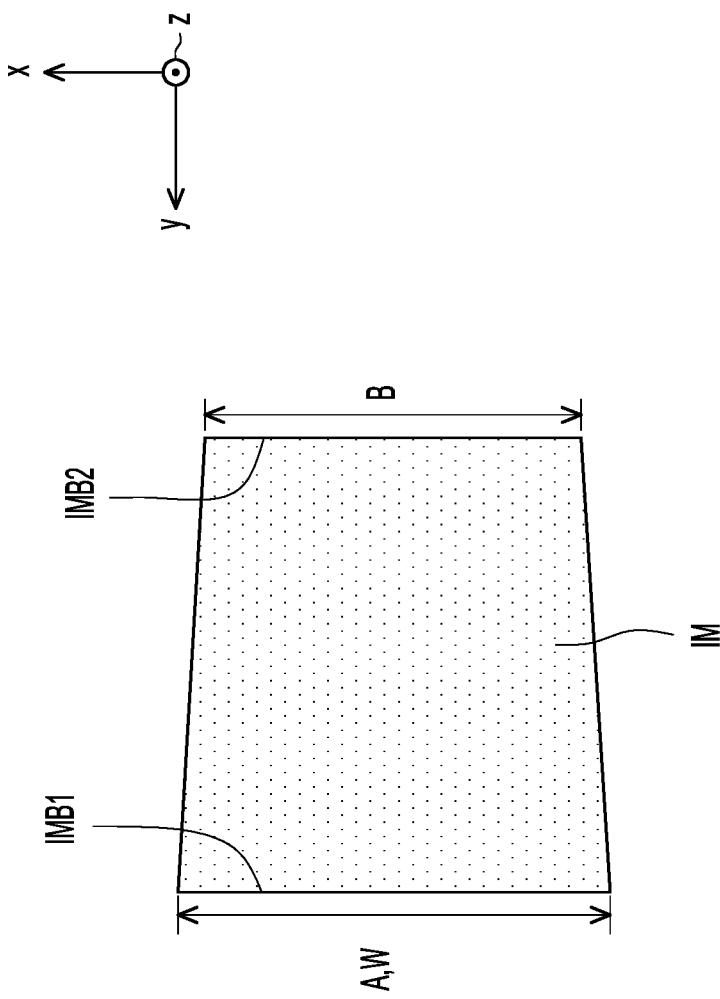
FIG. 6 schematically depicts an image formed by an image beam on a projection surface according to an embodiment of the disclosure.

FIG. 6 schematically depicts an image formed by an image beam on a projection surface according to an embodiment of the disclosure. Please refer to FIG. 1 and FIG. 6. In the embodiment, the light receiving surface LVa of the light valve LV is configured to receive the illumination beam ILB to convert the illumination beam ILB into the image beam IMB. The image beam IMB sequentially passes through the lens group LG and is reflected by the convex mirror M to the projection surface PS. The image beam IMB forms an image IM on the projection surface PS (that is, a paper surface of FIG. 6). A first edge ray IMB1 and a second edge ray IMB2 of two opposite sides of the image IM are substantially parallel to each other and respectively have a length A and a length B in the direction x. The image IM has a maximum width W in the direction x. [(B−A)/W]·100%=T, and |T|<0.5%. In short, in the embodiment, trapezoidal distortion of the image IM is less than 0.5%.

The following content will cite an embodiment of the imaging system IMS. It should be noted that the data listed in the following Table 1 to Table 4 are not used to limit the disclosure. Persons skilled in the art may make appropriate changes to the parameters or settings after referring to the disclosure, which should still fall within the scope of the disclosure.

TABLE 1

| Surface | Element | Type | Curvature radius (mm) | Spacing (mm) | Refractive index (Nd) | Abbe number (Vd) |
|---|---|---|---|---|---|---|
| Ma | Convex mirror M | Aspherical | 73.3 | −2.3 | | |
| L11 | First lens element | Aspherical | −12.4 | −1.1 | 1.53 | 56.3 |
| L12 | L1 | Aspherical | −3.1 | −5.0 | | |
| ASa | Aperture stop AS | | Infinity | −0.9 | | |
| L21 | Second lens | Spherical | 7.0 | −0.8 | 1.53 | 74.9 |
| L22 | element L2 | Spherical | 13.3 | −0.3 | | |
| L31 | Third lens | Freeform | −9.8 | −3.8 | 1.85 | 23.8 |
| L32 | element L3 | Aspherical | −29.4 | −1.0 | | |
| L41 | Fourth lens | Freeform | 30.1 | −2.3 | 1.64 | 59.9 |
| L42 | element L4 | Aspherical | 5.1 | −0.3 | | |
| L51 | Fifth lens element L5 | Spherical | 31.3 | −0.8 | 1.84 | 25.3 |
| L61 | Sixth lens element | Spherical | −9.6 | −4.5 | 1.50 | 81.5 |
| L62 | L6 | Spherical | 7.1 | −0.4 | | |
| L71 | Seventh lens | Aspherical | 7.1 | −2.4 | 1.53 | 74.7 |
| L72 | element L7 | Aspherical | 5.4 | −0.8 | | |
| AC1 | Actuator | | Infinity | −2.0 | 1.52 | 58.6 |
| AC2 | AC | | Infinity | −1.0 | | |
| PR1 | Total internal | | Infinity | −8.4 | 1.84 | 43.0 |
| PR2 | reflection prism PR | | Infinity | −0.5 | | |
| CG1 | Glass cap CG | | Infinity | −1.1 | 1.50 | 61.0 |
| CG2 | | | Infinity | −0.303 | | |
| LVa | Light valve LV | | Infinity | 0 | | |

Table 1 lists various parameters of the imaging system IMS according to an embodiment of the disclosure. Please refer to FIG. 2 and Table 1. The spacing in Table 1 refers to the straight line distance between two adjacent surfaces on the optical axis O. For example, the spacing of the surface Ma is the straight line distance between the surface Ma and the surface L11 on the optical axis O. For the curvature radius, the spacing, the refractive index, and the Abbe number corresponding to each surface/element in Table 1, please refer to the corresponding values of each curvature radius, spacing, refractive index, and Abbe number in the same column. In addition, in Table 1, Ma is the reflective surface of the mirror M, L11 is the first surface of the first lens element L1 facing the convex mirror M, L12 is the second surface of the first lens element L1 facing the light valve LV, ASa is the light passing cross section of the aperture stop AS, L21 is the first surface of the second lens element L2 facing the convex mirror M, L22 is the second surface of the second lens element L2 facing the light valve LV, L31 is the first surface of the third lens element L3 facing the convex mirror M, L32 is the second surface of the third lens element L3 facing the light valve LV, L41 is the first surface of the fourth lens element L4 facing the convex mirror M, L42 is the second surface of the fourth lens element L4 facing the light valve LV, L51 is the first surface of the fifth lens element L5 facing the convex mirror M, L61 is the first surface of the sixth lens element L6 facing the convex mirror M, L62 is the second surface of the sixth lens element L6 facing the light valve LV, L71 is the first surface of the seventh lens element L7 facing the convex mirror M, L72 is the second surface of the seventh lens element L7 facing the light valve LV, AC1 is a first surface of the actuator AC facing the convex mirror M, AC2 is a second surface of the actuator AC facing the light valve LV, PR1 is a first surface of the light combining element PR facing the convex mirror M, PR2 is a second surface of the light combining element PR facing the light valve LV, CG1 is a first surface of the protection cap CG facing the convex mirror M, CG2 is a second surface of the protection cap CG facing the light valve LV, and LVa is the light receiving surface of the light valve LV.

Please refer to FIG. 2 and Table 1. In the embodiment, the reflective surface Ma of the convex mirror M may be aspherical. In the embodiment, the first lens element L1 may be aspherical. In detail, the first surface L11 facing the convex mirror M and the second surface L12 facing the light valve LV of the first lens element L1 may both be aspherical. In the embodiment, the second lens element L2 may be spherical. In detail, the first surface L21 facing the convex mirror M and the second surface L22 facing the light valve LV of the second lens element L2 may both be spherical.

In the embodiment, the third lens element L3 may be a freeform surface lens element. In detail, the first surface L31 facing the convex mirror M of the third lens element L3 may be a freeform surface, and the second surface L32 facing the light valve LV of the third lens element L3 may be aspherical. In the embodiment, the fourth lens element L4 may be a freeform surface lens element. In detail, the first surface L41 facing the convex mirror M of the fourth lens element L4 may be a freeform surface, and the second surface L42 facing the light valve LV of the fourth lens element L4 may be aspherical.

In the embodiment, the fifth lens element L5 may be spherical. In detail, the first surface L51 facing the convex mirror M and the second surface L52 facing the light valve LV of the fifth lens element L5 may both be spherical. In the embodiment, the sixth lens element L6 may be spherical. In detail, the first surface L61 facing the convex mirror M and the second surface L62 facing the light valve LV of the sixth lens element L6 may both be spherical. In addition, in the embodiment, the second surface L52 of the fifth lens element L5 and the first surface L61 of the sixth lens element L6 may be bonded together, so that the fifth lens element L5 and the sixth lens element L6 form a double cemented lens. The refractive power of the double cemented lens formed by the fifth lens element L5 and the sixth lens element L6 may be negative. In the embodiment, the seventh lens element L7 may be aspherical. In detail, the first surface L71 facing the convex mirror M and the second surface L72 facing the light valve LV of the seventh lens element L7 may both be aspherical.

The reflective surface Ma of the mirror M, the first surface L11 facing the convex mirror M of the first lens element L1, the second surface L12 facing the light valve LV of the first lens element L1, the second surface L32 facing the light valve LV of the third lens element L3, and the second surface L42 facing the light valve LV of the fourth lens element L4 are even-order aspheric surfaces. The even-order aspheric surfaces may be expressed by the following equation:

$$Z = \frac{cr^2}{1+\sqrt{1-(1+k)c^2r^2}} + A_2 r^2 + A_4 r^4 + A_6 r^6 + A_8 r^8 + A_{10} r^{10} + A_{12} r^{12} + A_{14} r^{14} + \ldots$$

In the equation, Z is the offset (sag) in the direction of the optical axis O; c is the reciprocal of the radius of the osculating sphere, which is the reciprocal of the curvature radius (such as the curvature radius in Table 1) close to the optical axis O; k is the conic constant; r is the height of the aspheric surface, that is, the height from the center of the convex mirror/lens element to the edge of the convex mirror/lens element; and $A_2, A_4, A_6, A_8, A_{10}, A_{12}, A_{14} \ldots$ are aspheric coefficients. Table 2 lists the quadric surface coefficients and the aspheric coefficients of the reflective surface Ma of the mirror M, the first surface L11 facing the convex mirror M of the first lens element L1, the second surface L12 facing the light valve LV of the first lens element L1, the second surface L32 facing the light valve LV of the third lens element L3, and the second surface L42 facing the light valve LV of the fourth lens element L4.

TABLE 2

| Surface | Ma | L11 | L12 | L32 | L42 |
|---|---|---|---|---|---|
| Quadric surface coefficient k | 0 | 0 | −1.056 | 0 | 0 |
| Coefficient $A_4$ | −8.41E−06 | −4.36E−03 | −2.87E−03 | 9.81E−04 | −1.32E−03 |
| Coefficient $A_6$ | −3.17E−07 | 3.50E−04 | −2.78E−03 | −1.48E−04 | −9.89E−05 |
| Coefficient $A_8$ | 4.30E−09 | −8.91E−06 | 1.08E−03 | −2.40E−05 | 1.65E−05 |
| Coefficient $A_{10}$ | −1.85E−11 | −6.98E−07 | −1.94E−04 | 2.04E−06 | −4.62E−07 |
| Coefficient $A_{12}$ | 0 | 5.51E−08 | 1.71E−05 | 0 | 0 |
| Coefficient $A_{14}$ | 0 | −1.2E−09 | −6.1E−07 | 0 | 0 |

Please refer to FIG. 2. In the embodiment, the first surface L31 of the third lens element L3 and the first surface L41 of the fourth lens element L4 are freeform surfaces. The freeform surfaces may be expressed by the following equation:

$$Z = \frac{cr^2}{1+\sqrt{1-(1+k)c^2r^2}} + \sum_{j=2}^{66} C_j x^m y^n \quad j = \frac{(m+n)^2 + m + 3n}{2} + 1$$

In the equation, Z is the offset (sag) in the direction of the optical axis O; c is the vertex curvature (CUY); k is the conic constant; r is the height of the freeform surface, that is, the height from the center of the freeform surface to the edge of the freeform surface; and $C_j$ is the coefficient of the monomial $x^m y^n$. Table 3 lists the coefficients of the monomials $x^m y^n$ of the first surface L31 of the third lens element L3 and the first surface L41 of the fourth lens element L4.

TABLE 3

| Coefficient of monomial $x^m y^n$ | L31 | L41 |
|---|---|---|
| Coefficient of y ($C_3$) | −7.52E−03 | 0 |
| Coefficient of $x^2$ ($C_4$) | −2.70E−03 | 0 |

TABLE 3-continued

| Coefficient of monomial $x^m y^n$ | L31 | L41 |
|---|---|---|
| Coefficient of $y^2$ ($C_6$) | −2.47E−03 | 0 |
| Coefficient of $x^2 y$ ($C_8$) | 1.98E−04 | 0 |
| Coefficient of $y^3$ ($C_{10}$) | 2.26E−04 | 0 |
| Coefficient of $x^4$ ($C_{11}$) | 8.77E−05 | 3.50E−03 |
| Coefficient of $x^2 y^2$ ($C_{13}$) | 3.80E−05 | 6.93E−03 |
| Coefficient of $y^4$ ($C_{15}$) | 4.20E−05 | 3.47E−03 |
| Coefficient of $x^4 y$ ($C_{17}$) | 9.35E−06 | 8.09E−07 |
| Coefficient of $x^2 y^3$ ($C_{19}$) | 1.40E−05 | −6.12E−06 |
| Coefficient of $y^5$ ($C_{21}$) | 1.33E−05 | −9.4E−07 |
| Coefficient of $x^6$ ($C_{22}$) | −1.57E−04 | −1.80E−04 |
| Coefficient of $x^4 y^2$ ($C_{24}$) | −4.34E−04 | −5.46E−04 |
| Coefficient of $x^2 y^4$ ($C_{26}$) | −4.14E−04 | −5.11E−04 |
| Coefficient of $y^6$ ($C_{28}$) | −1.32E−04 | −1.94E−04 |
| Coefficient of $x^6 y$ ($C_{30}$) | −1.28E−07 | 0 |
| Coefficient of $x^4 y^3$ ($C_{32}$) | 6.93E−06 | 0 |
| Coefficient of $x^2 y^5$ ($C_{34}$) | 2.42E−07 | 0 |
| Coefficient of $x y^6$ ($C_{35}$) | −1.19E−09 | 0 |
| Coefficient of $x^8$ ($C_{37}$) | 1.08E−05 | 9.75E−06 |
| Coefficient of $x^6 y^2$ ($C_{39}$) | 4.48E−05 | 4.69E−05 |
| Coefficient of $x^4 y^4$ ($C_{41}$) | 6.30E−05 | 6.39E−05 |
| Coefficient of $x^2 y^6$ ($C_{43}$) | 3.78E−05 | 3.53E−05 |
| Coefficient of $y^8$ ($C_{45}$) | 9.15E−06 | 1.31E−05 |
| Coefficient of $x^8 y$ ($C_{47}$) | −2.18E−07 | 0 |
| Coefficient of $x^6 y^3$ ($C_{49}$) | −1.08E−06 | 0 |
| Coefficient of $x^4 y^5$ ($C_{51}$) | −1.56E−06 | 0 |
| Coefficient of $x^2 y^7$ ($C_{53}$) | −2.00E−07 | 0 |
| Coefficient of $y^9$ ($C_{55}$) | −6.3E−08 | 0 |
| Coefficient of $x^{10}$ ($C_{56}$) | 1.09E−07 | −3.5E−08 |
| Coefficient of $x^8 y^2$ ($C_{58}$) | 5.46E−07 | −1.19E−06 |
| Coefficient of $x^6 y^4$ ($C_{60}$) | 1.09E−06 | −2.37E−06 |
| Coefficient of $x^4 y^6$ ($C_{62}$) | 1.09E−06 | −1.19E−06 |
| Coefficient of $x^2 y^8$ ($C_{64}$) | 5.39E−07 | −1.55E−07 |
| Coefficient of $y^{10}$ ($C_{66}$) | 1.72E−07 | −3E−07 |

Please refer to FIG. 2. In the embodiment, the first surface L11 of the first lens element L1, the first surface L21 of the second lens element L2, and the first surface L41 of the fourth lens element L4 are inclined relative to the optical axis O of the lens group LG. Table 4 lists the inclination angles (that is, the included angle α, the included angle β, and the included angle γ) of the first surface L11 of the first lens element L1, the first surface L21 of the second lens element L2, and the first surface L41 of the fourth lens element L4.

TABLE 4

| Surface | L11 | L21 | L41 |
|---|---|---|---|
| Inclination angle (°) | α = 4.7° | β = −10.5° | γ = 5.7° |

In addition, please refer to FIG. 2 and Table 1. In the embodiment, the first lens element L1 may be a convex-concave lens element with a concave surface facing the reduction side, the second lens element L2 may be a convex-concave lens element with a convex surface facing the reduction side, the third lens element L3 may be a concave-convex lens element with a concave surface facing the reduction side, the fourth lens element L4 may be a concave-convex lens element with a convex surface facing the reduction side, the fifth lens element L5 may be a biconcave lens element, the sixth lens element L6 may be a biconvex lens element, and the seventh lens element L7 may be a concave-convex lens element with a convex surface facing the reduction side.

In addition, in the embodiment, the materials of the first lens element L1, the second lens element L2, the third lens element L3, the fourth lens element L4, the fifth lens element L5, the sixth lens element L6, and the seventh lens element L7 may respectively be plastic, glass, glass, glass, glass, and glass, but the disclosure is not limited thereto.

In the embodiment, the projection lens PL may be a fixed-focus lens, which has a simple structure, is easy to assemble, and has a short manufacturing time compared with a zoom lens. In the embodiment, the projection lens PL has a large half field of view. In other words, the projection lens PL has a small throw ratio and can project a wide projection image within a short projection distance. For example, in the embodiment, the half field of view of the projection lens PL may be greater than 45°, but the disclosure is not limited thereto.

Figure 7:
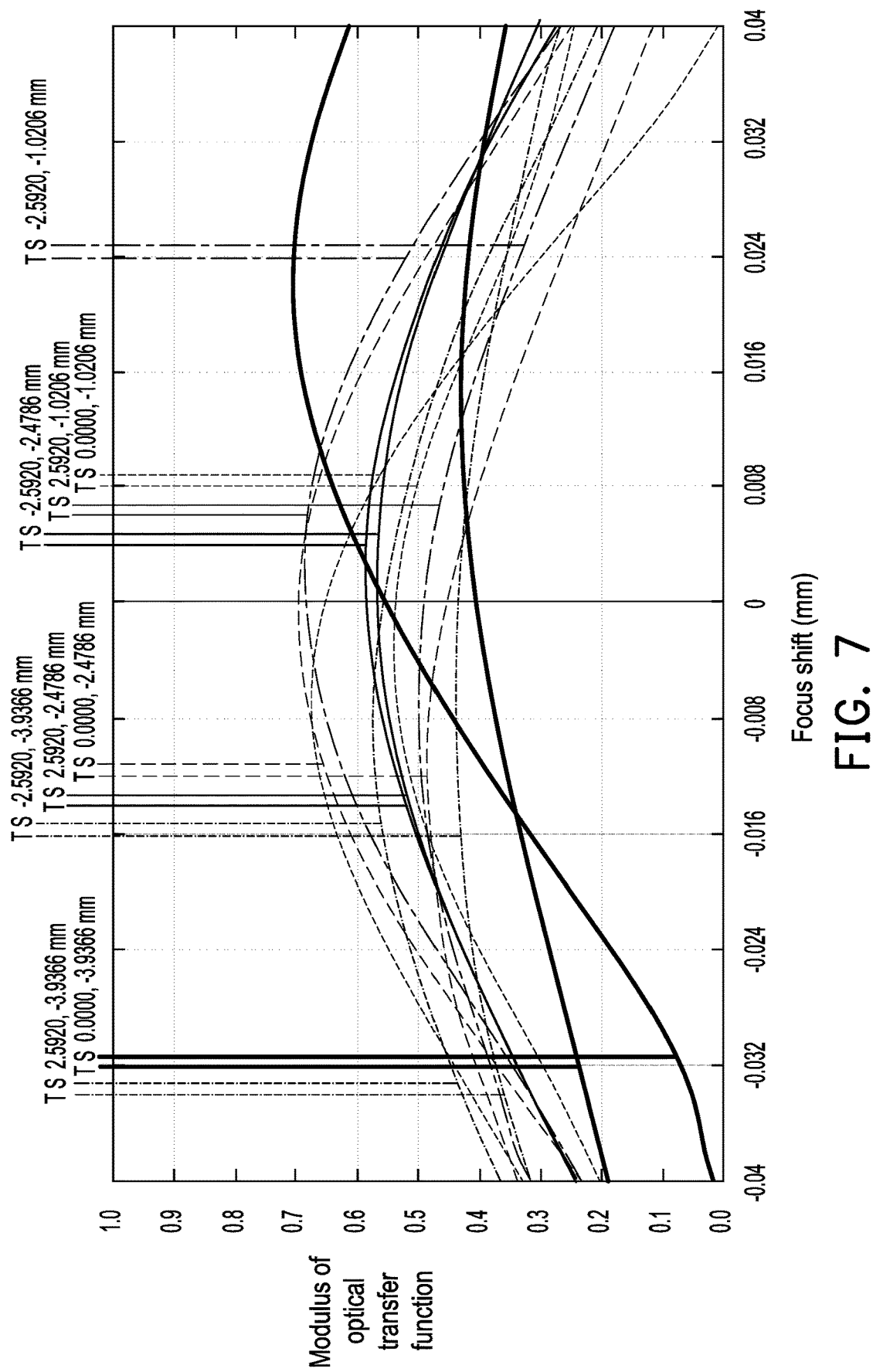
FIG. 7 is a modulation transfer function diagram of the projection lens of FIG. 2.

FIG. 7 is a modulation transfer function diagram of the projection lens of FIG. 2. Please refer to FIG. 7. FIG. 7 is the modulation transfer function (MTF) diagram of the projection lens PL at different image heights, where the horizontal axis is the focus shift, the vertical axis is the modulus of the optical transfer function, T represents the curve in the meridian direction, S represents the curve in the sagittal direction, and the values marked next to "TS" represent the image heights.

Figure 8:
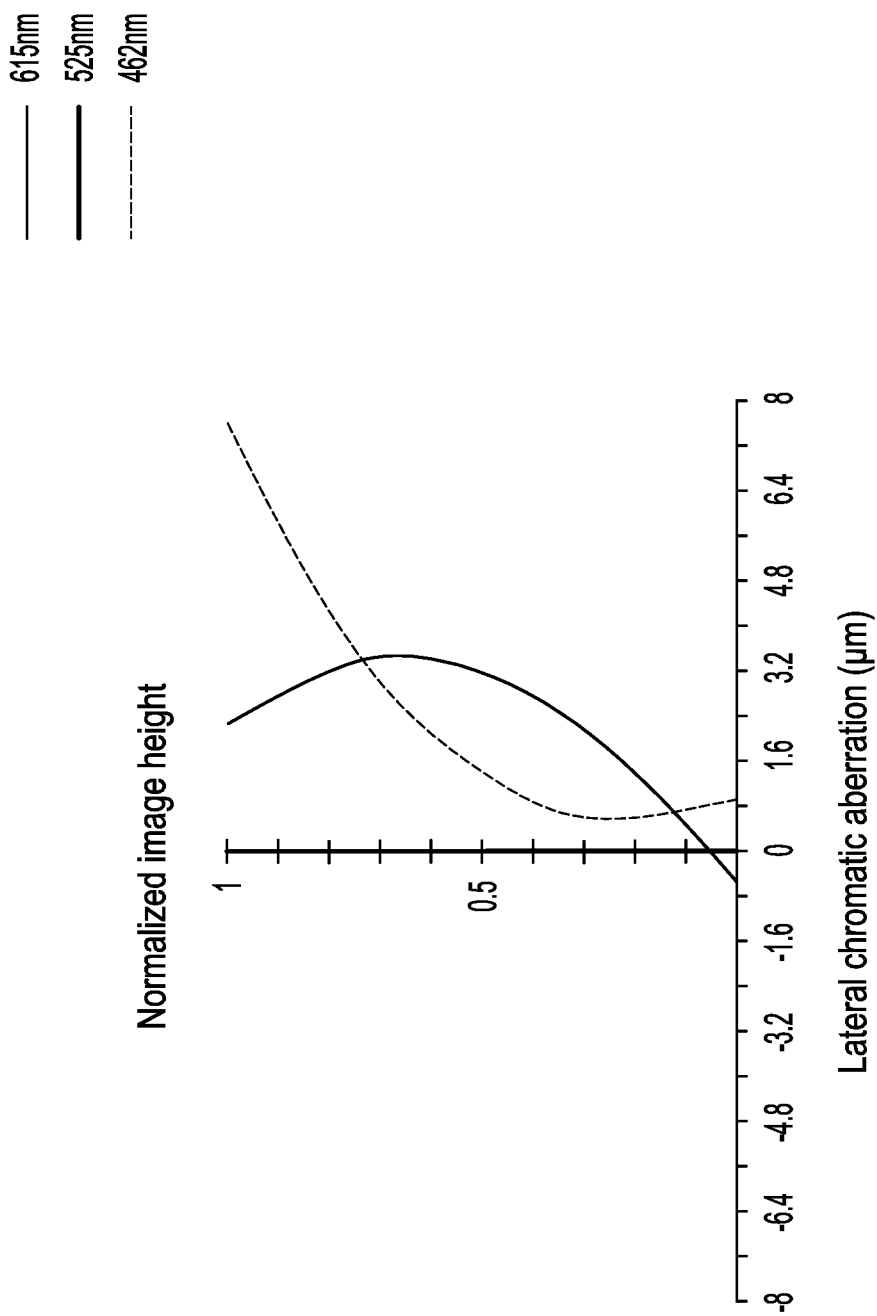
FIG. 8 is a lateral chromatic aberration diagram of the projection lens of FIG. 2.
Figure 9A:
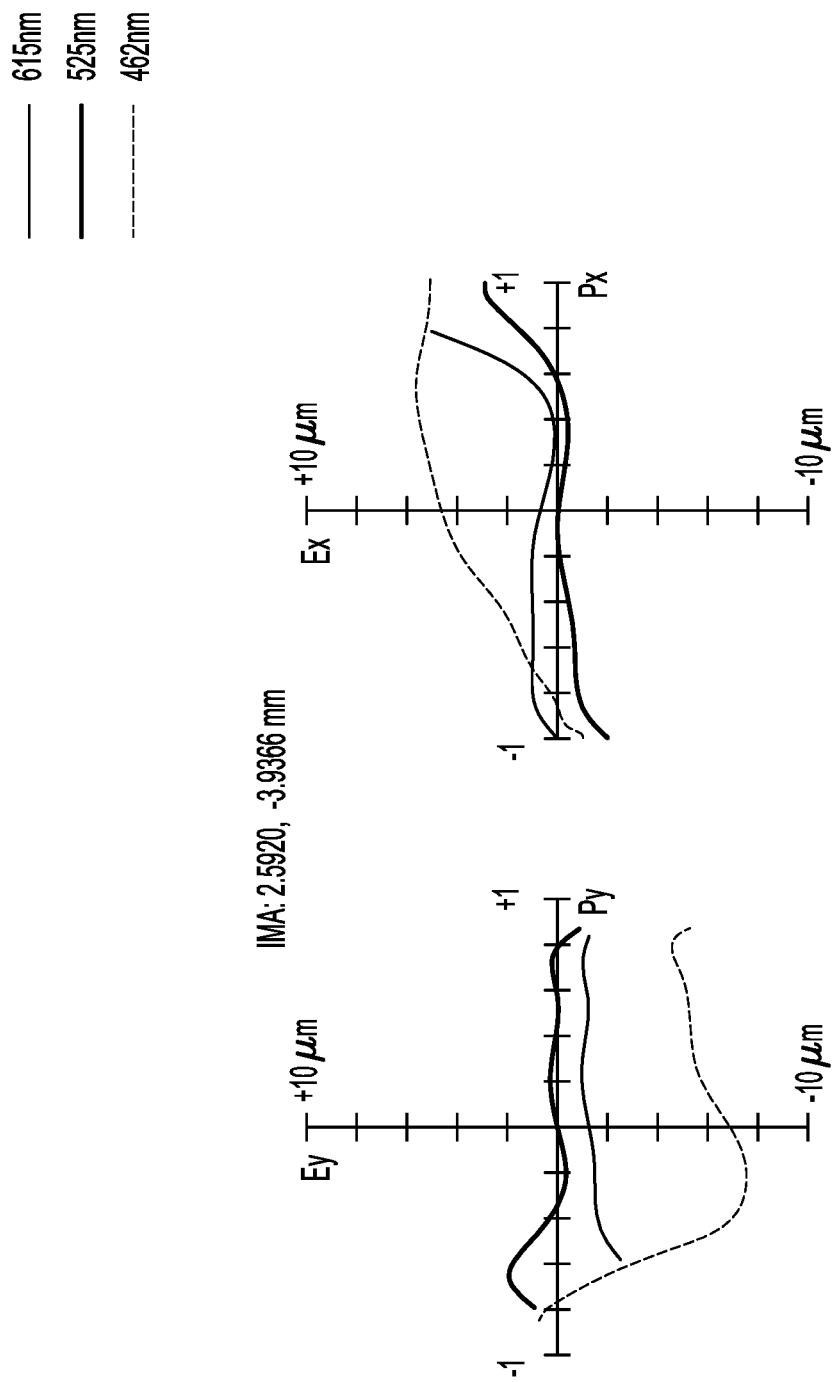
FIG. 9A to FIG. 9I are ray fan plots of the projection lens of FIG. 2.
Figure 9B:
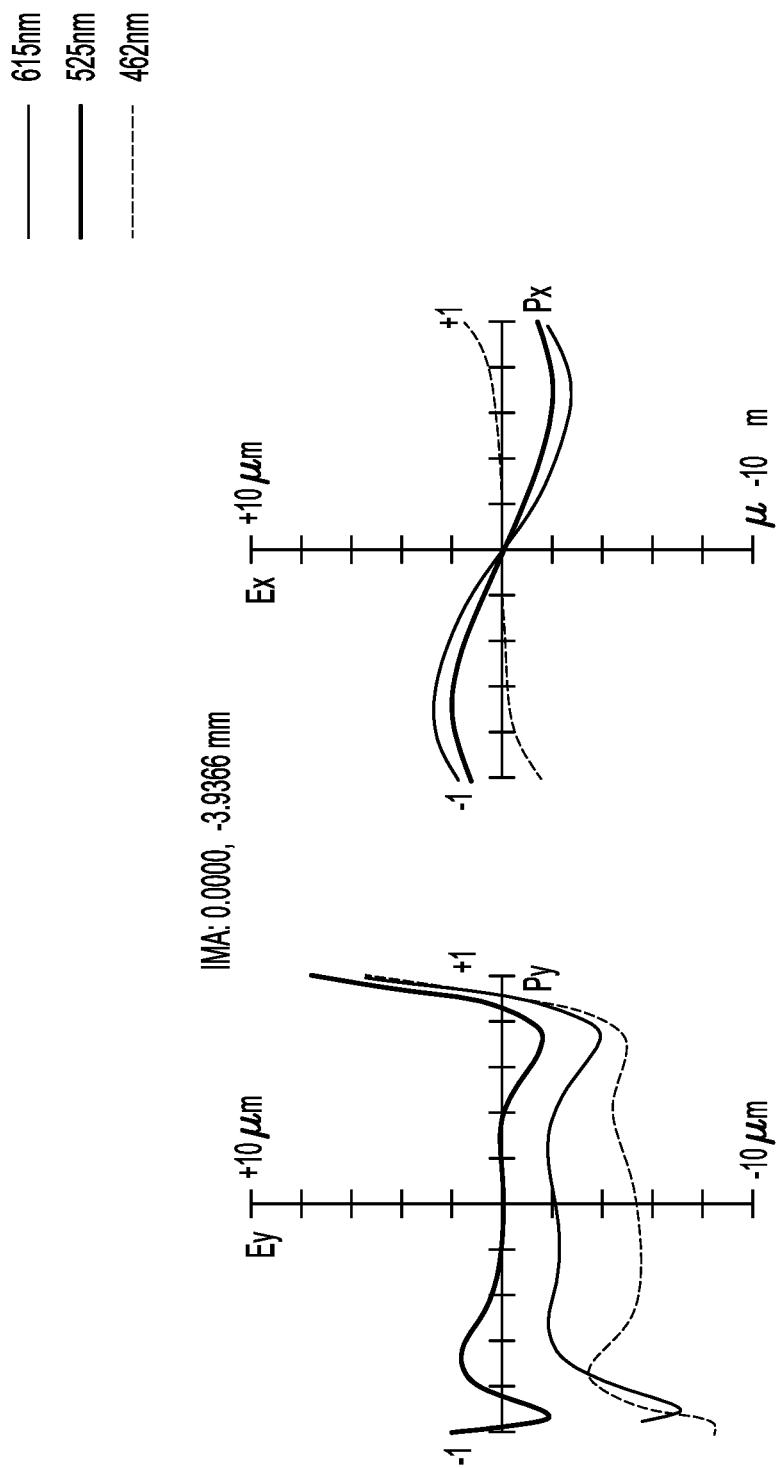
Figure 9C:
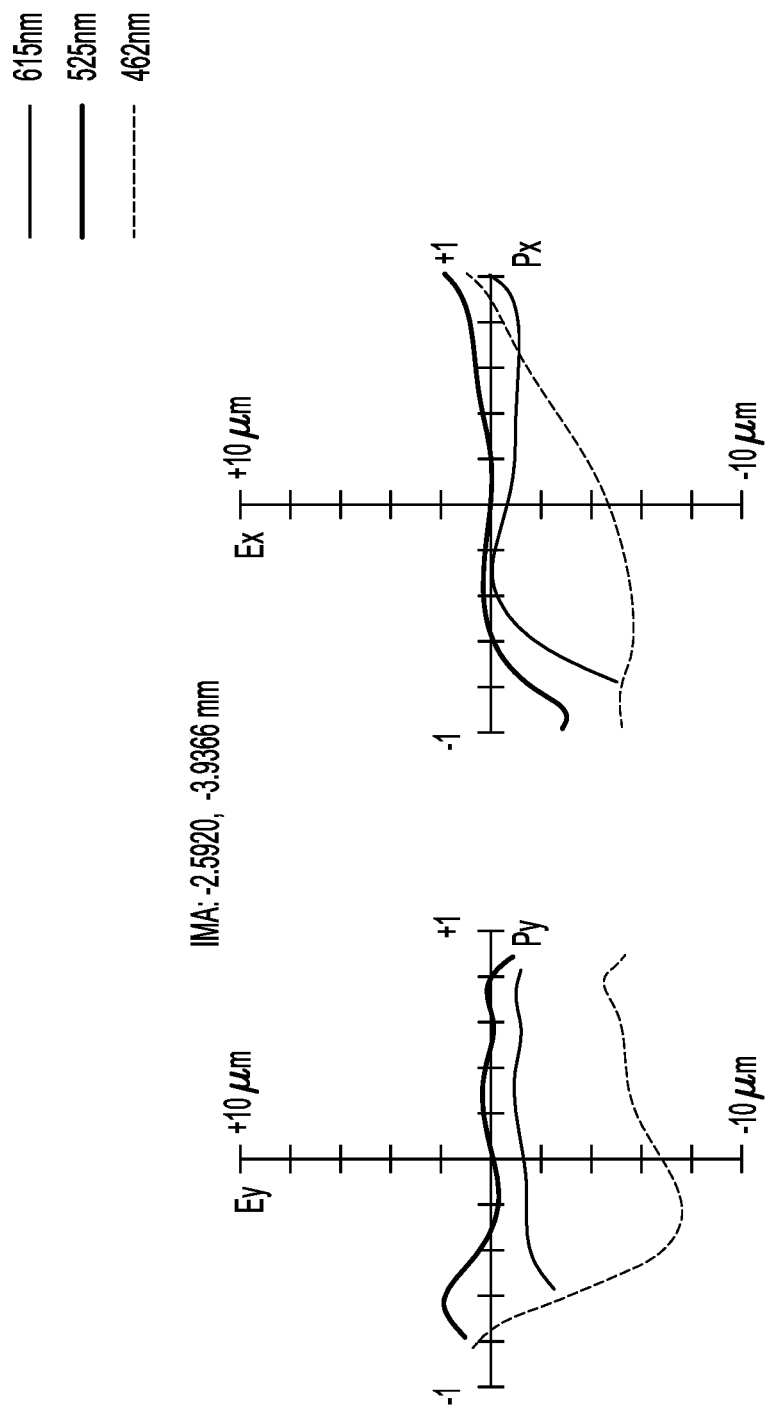
Figure 9D:
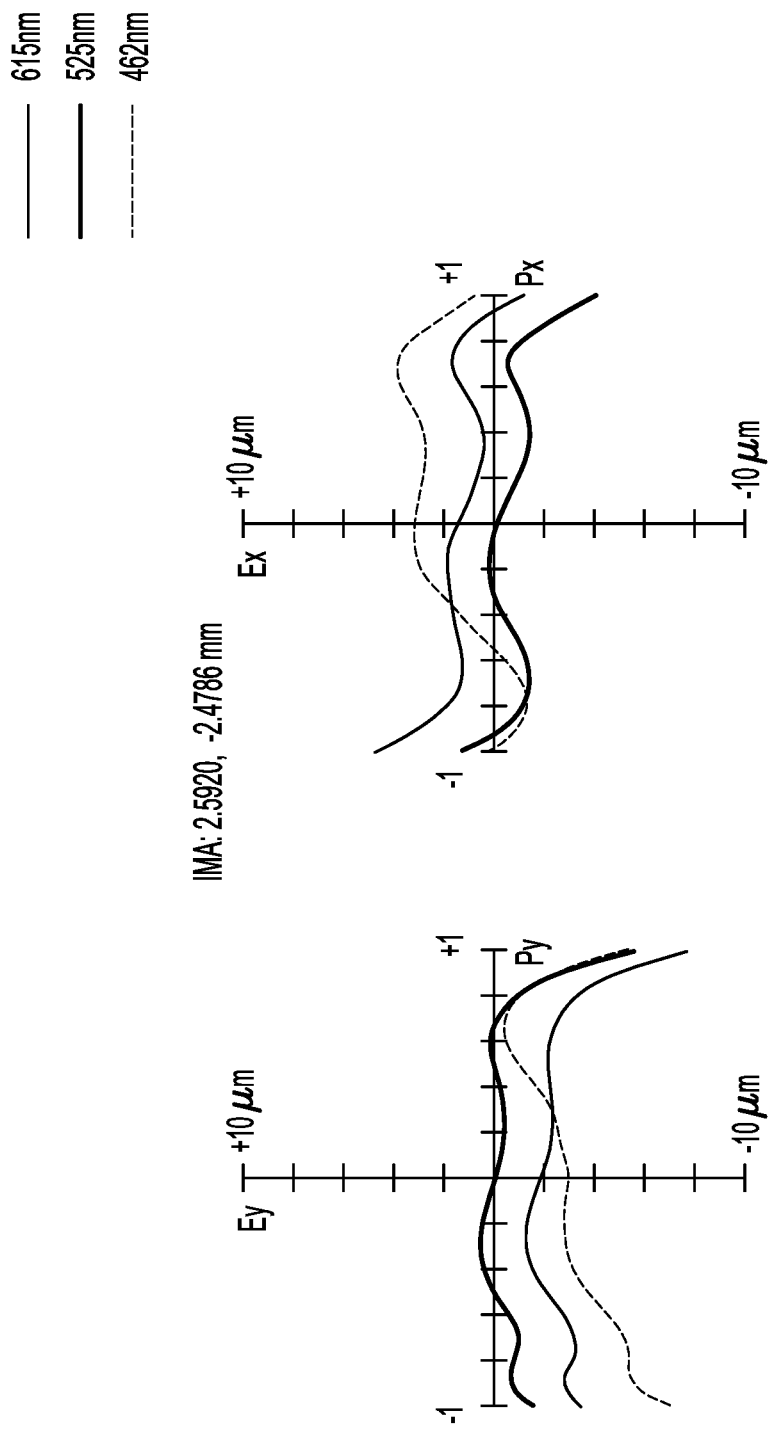
Figure 9E:
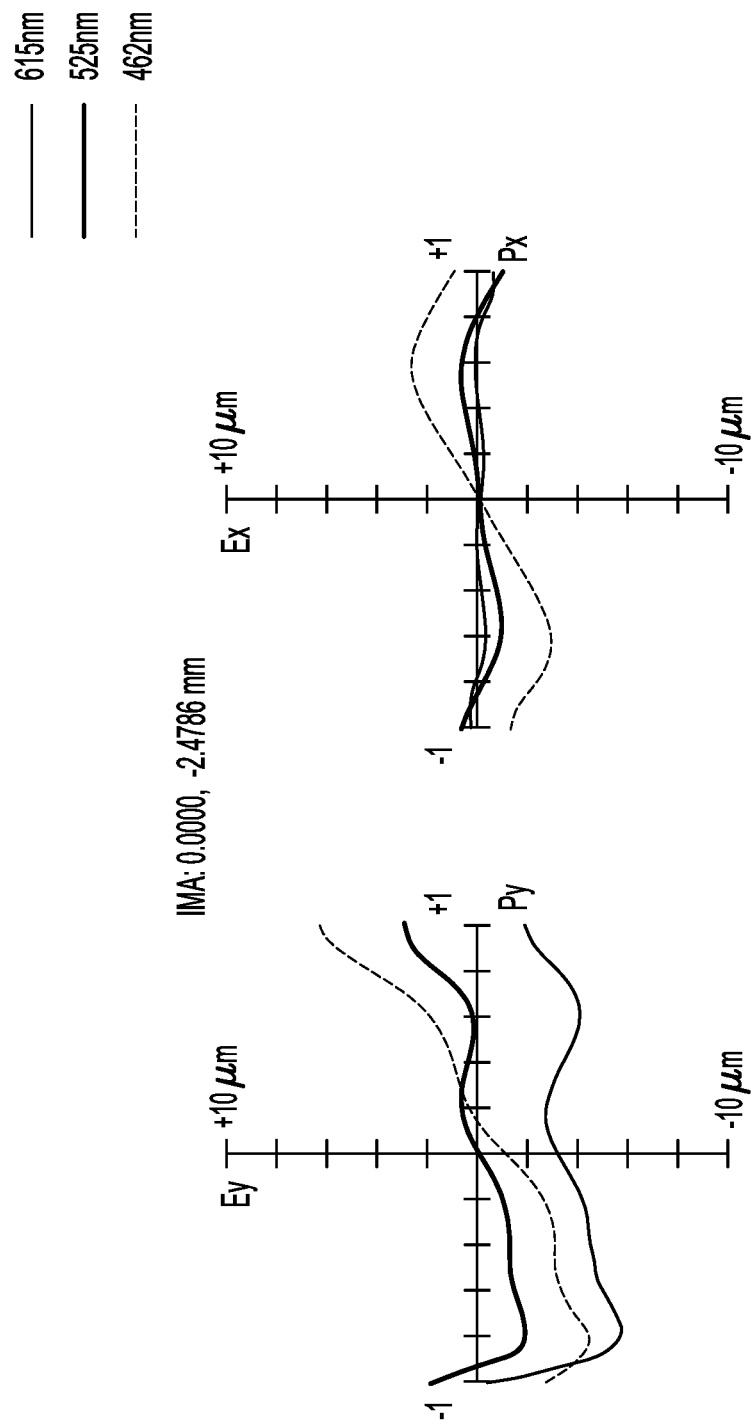
Figure 9F:
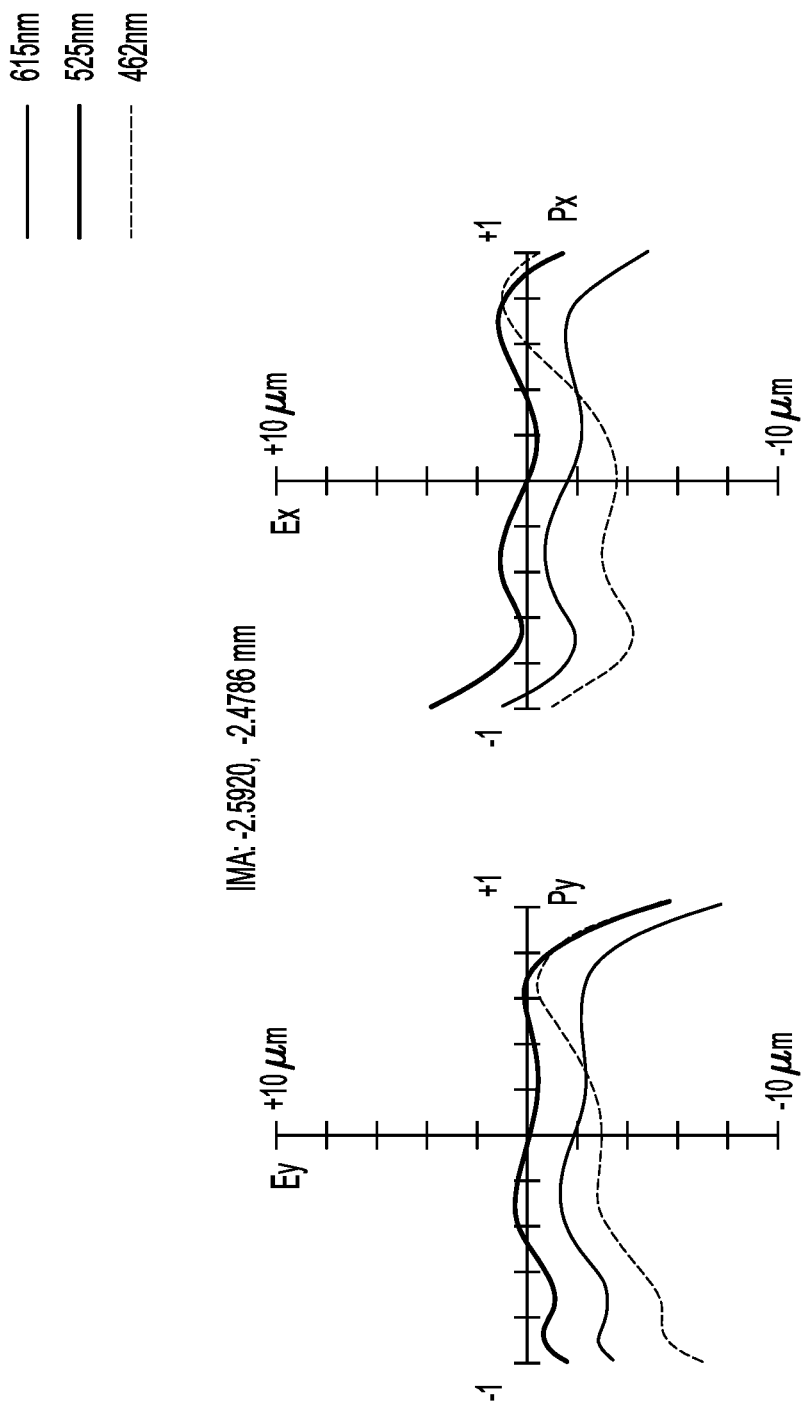
Figure 9G:
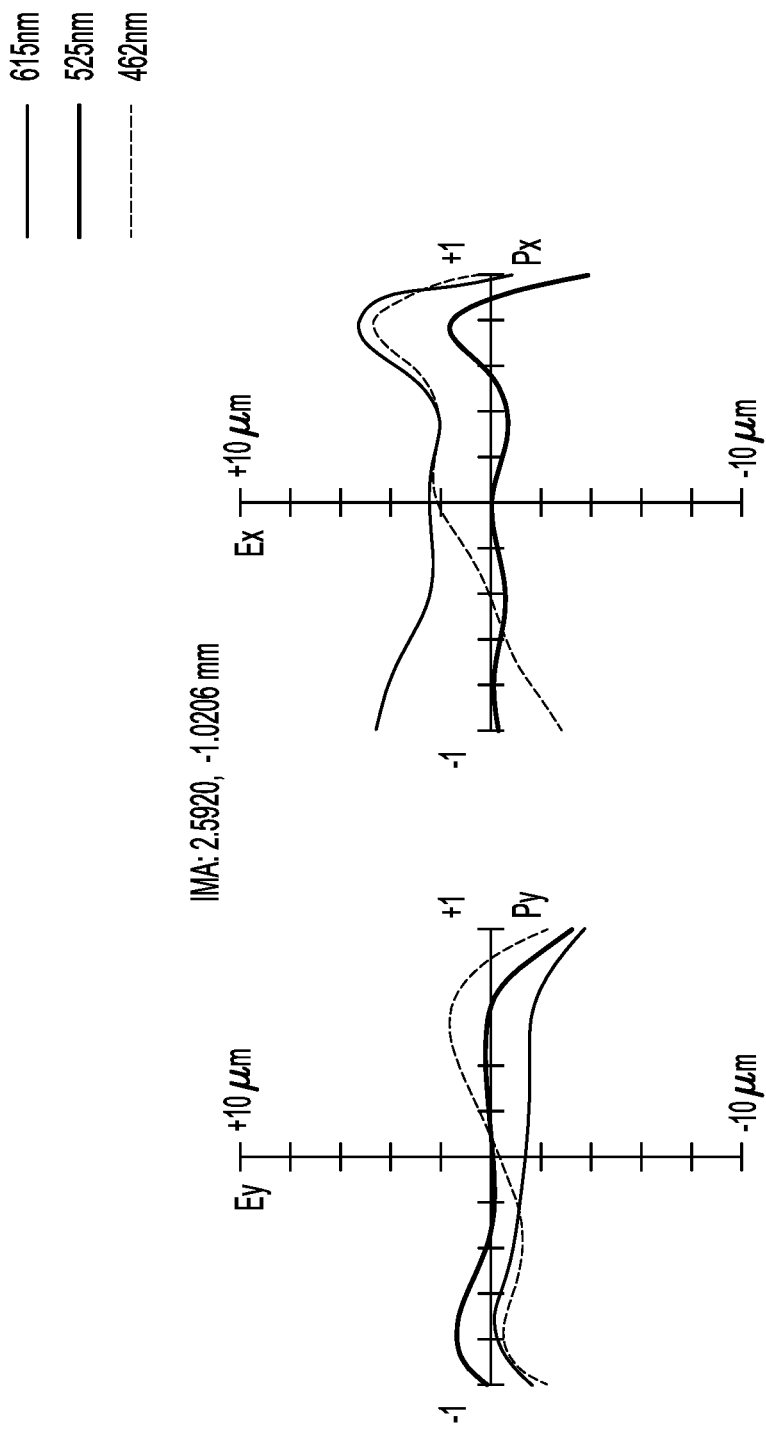
Figure 9H:
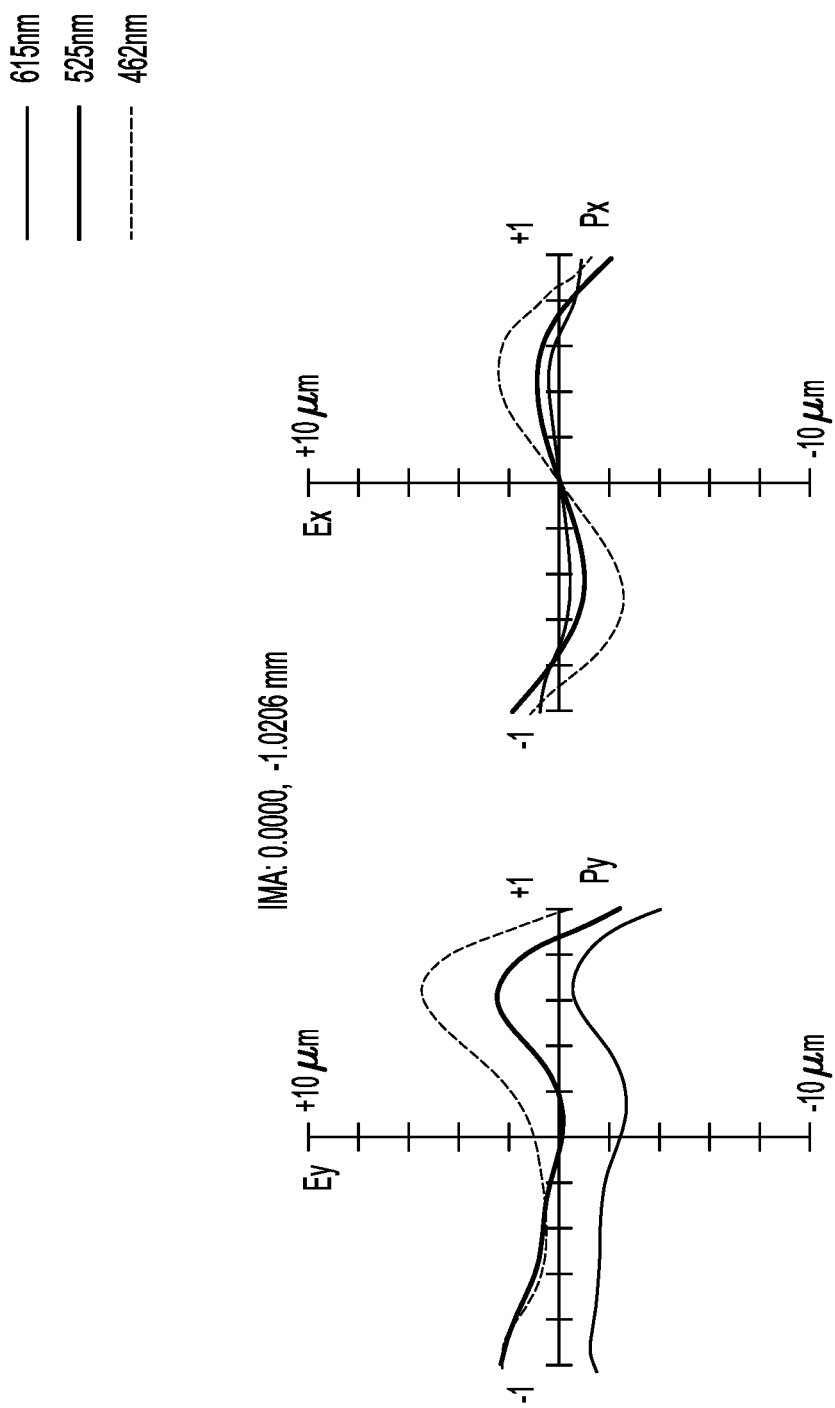
Figure 9I:
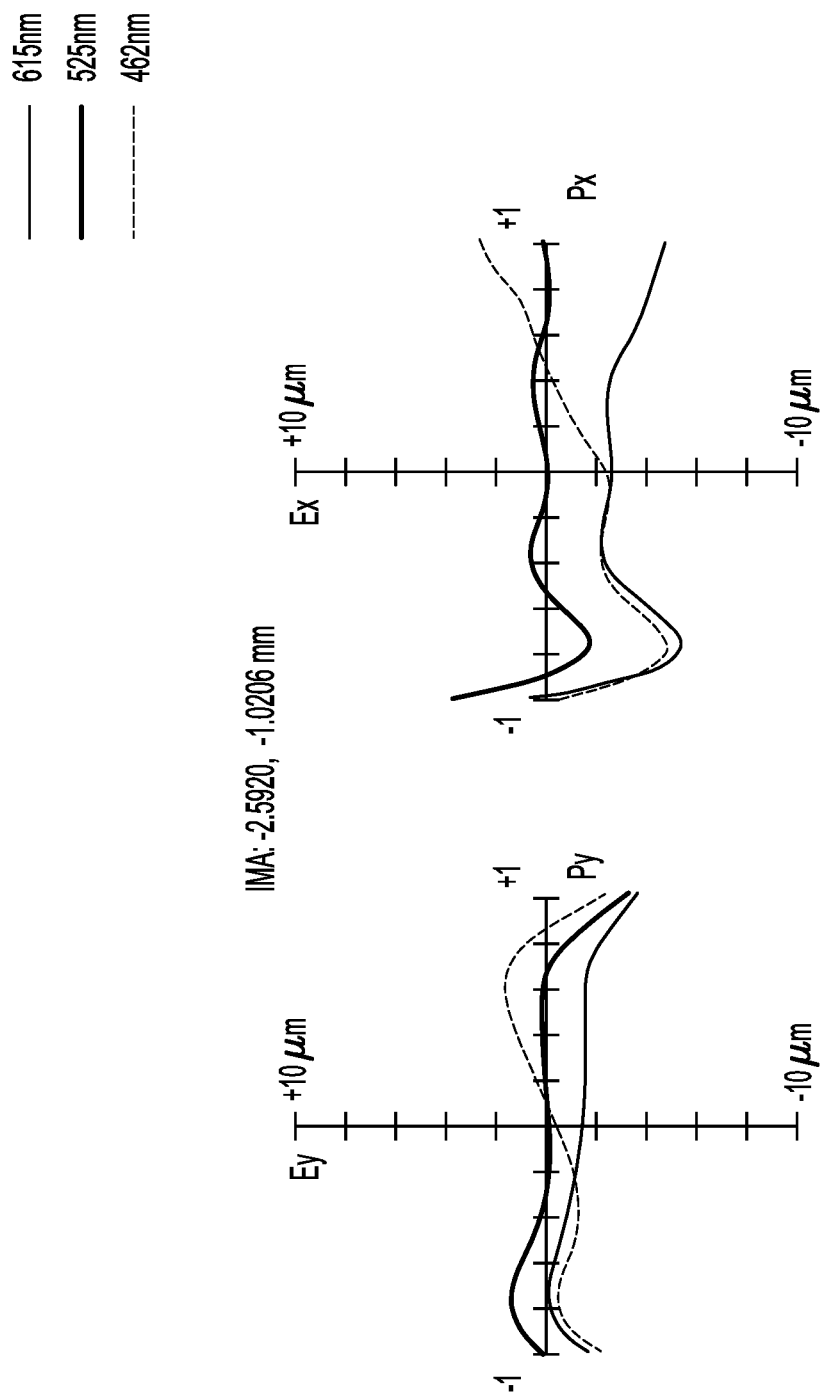

FIG. 8 is a lateral chromatic aberration diagram of the projection lens of FIG. 2, which is a simulation data diagram of light with wavelengths of 462 nm, 525 nm, and 615 nm, where the ordinate is the normalized image height.

FIG. 9A to FIG. 9I are ray fan plots of the projection lens of FIG. 2. Please refer to FIG. 9A to FIG. 9I. FIG. 9A to FIG. 9I are the ray fan plots of the projection lens PL at different image heights, where the maximum scale and the minimum scale of the Ex axis and the Ey axis are respectively +10 μm and −10 μm, and the Px axis and the Py axis have been normalized, so the maximum scale and the minimum scale of the Px and Py axes are respectively 1 and −1.

The diagrams shown in FIG. 7, FIG. 8, and FIG. 9A to FIG. 9I are all within the standard range. It can be verified that the projection lens PL of the embodiment can achieve a good imaging effect.

Figure 10:
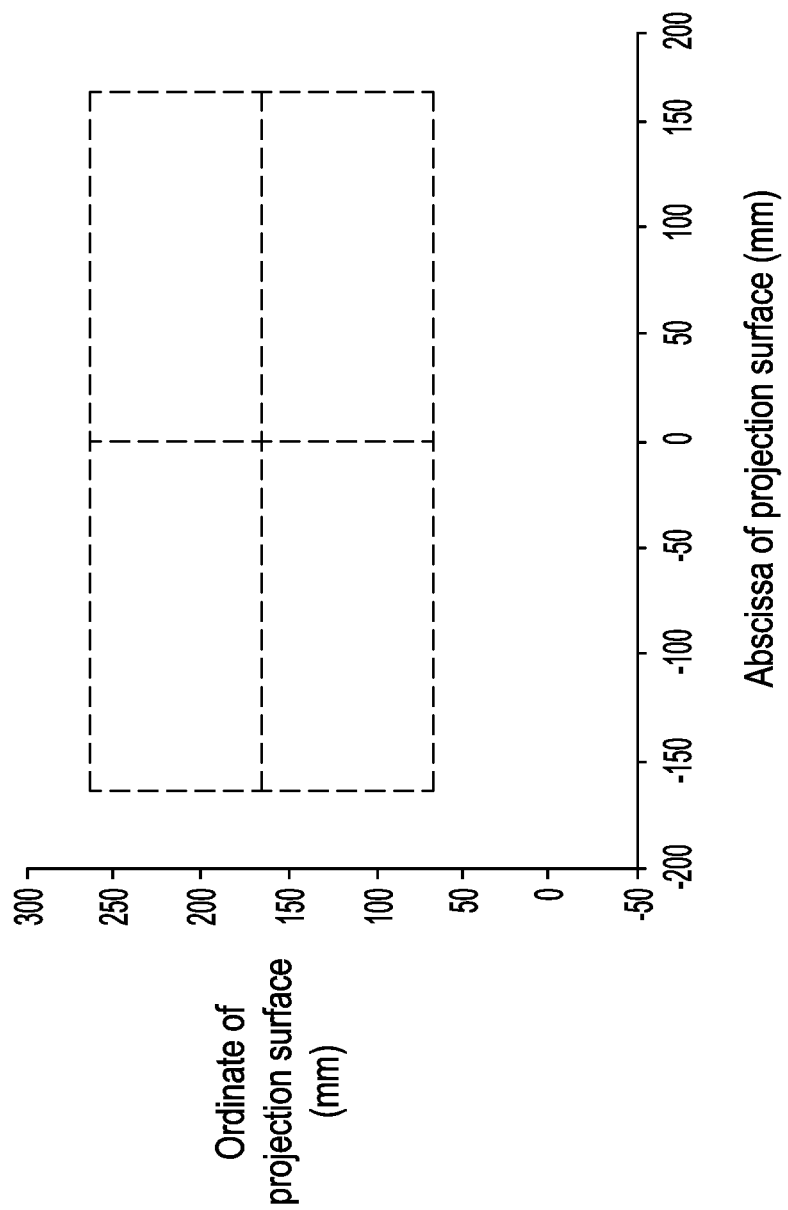
FIG. 10 schematically depicts an image on a projection surface of the projection device of FIG. 1.
Figure 11:
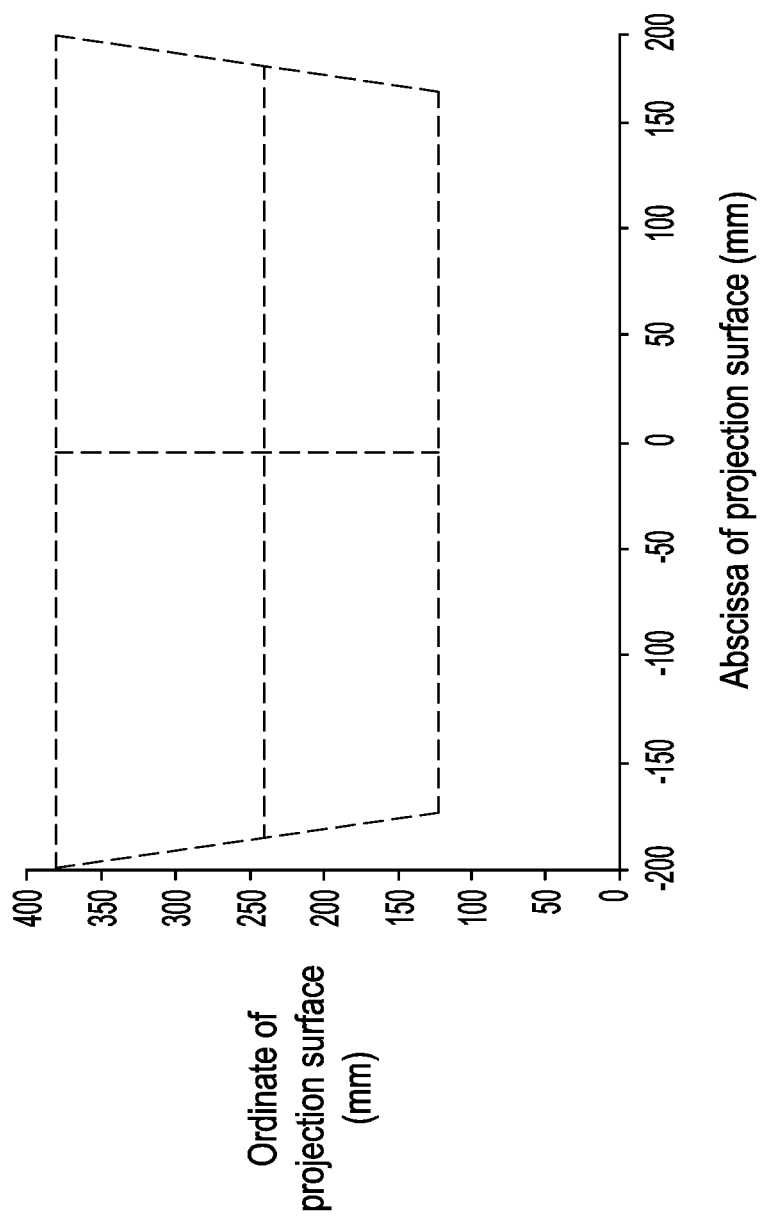
FIG. 11 schematically depicts an image on a projection surface of a projection device of a comparative example.

FIG. 10 schematically depicts an image on a projection surface of the projection device of FIG. 1. FIG. 11 schematically depicts an image on a projection surface of a projection device of a comparative example. The projection device (not shown) corresponding to the comparative example of FIG. 11 is similar to the projection device 100 of an embodiment of the disclosure corresponding to FIG. 10. The difference between the two is that: in the projection device corresponding to the comparative example of FIG. 11, a first surface (referring to a surface of a third lens element facing the convex mirror) of the third lens element (referring to the third lens element sequentially arranged from the magnification side to the reduction side of the projection lens) and a first surface (referring to a surface of a fourth lens element facing the convex mirror) of the fourth lens element (referring to the fourth lens element sequentially arranged from the magnification side to the reduction side of the projection lens) are not freeform surfaces, and a first surface (referring to a surface of a first lens element facing the convex mirror) of the first lens element (referring to the first lens element sequentially arranged from the magnification side to the reduction side of the projection lens), a first surface (referring to a surface of a second lens element facing the convex mirror) of the second lens element (referring to the second lens element sequentially arranged from the magnification side to the reduction side of the projection lens), and the first surface (referring to the surface of the fourth lens element facing the convex mirror) of the fourth lens element (referring to the fourth lens element sequentially arranged from the magnification side to the reduction side of the projection lens) are not inclined relative to the optical axis of the lens group. Comparing FIG. 10 and FIG. 11, it can be verified that letting at least one of the third lens element L3 and the fourth lens element L4 of the projection lens PL to be a freeform surface lens element and/or letting at least two of a surface of the first lens element L1, a surface of the second lens element L2, and a surface of the fourth lens element L4 to be inclined relative to the optical axis O, and the inclination directions of the at least two to be opposite, the phenomenon of trapezoidal distortion can indeed be effectively reduced.

In summary, the projection device and the imaging system thereof of an embodiment of the disclosure include the projection lens having the magnification side and the reduction side. The projection lens includes the lens group configured on the optical path between the magnification side and the reduction side and the convex mirror configured on the optical path between the lens group and the magnification side. The lens group includes the first lens element, the second lens element, the third lens element, the fourth lens element, the fifth lens element, the sixth lens element, and the seventh lens element sequentially arranged from the magnification side to the reduction side. The refractive powers of the first lens element, the second lens element, the third lens element, the fourth lens element, the fifth lens element, the sixth lens element, and the seventh lens element are respectively negative, negative, positive, positive, negative, positive, and positive. In particular, at least one of the third lens element and the fourth lens element is a freeform surface lens element. In this way, the projection lens itself can reduce the phenomenon of trapezoidal distortion without using software to correct trapezoidal distortion and losing the brightness and resolution of the projection image.

In addition, in an embodiment of the disclosure, at least two of a surface of the first lens element, a surface of the second lens element, and a surface of the fourth lens element are inclined relative to the optical axis of the lens group, the inclination directions of the at least two are opposite, and the absolute values of the inclination angles of the at least two are greater than 0° and less than or equal to 20°. In this way, the phenomenon of trapezoidal distortion can be further reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An imaging system, comprising a light valve and a projection lens, wherein
the light valve is configured to provide an image beam;
the projection lens is configured to image the image beam from the light valve on a projection surface, and there is an included angle between the projection surface and a light receiving surface of the light valve;
the projection lens is configured on a transmission path of the image beam and has a reduction side and a magnification side, wherein the light valve is configured on the reduction side of the projection lens, the projection surface is configured on the magnification side of the projection lens, and the projection lens comprises:
a lens group, configured on an optical path between the magnification side and the reduction side, and comprising a first lens element, a second lens element, a third lens element, a fourth lens element, a fifth lens element, a sixth lens element, and a seventh lens element sequentially arranged from the magnification side to the reduction side, wherein refractive powers of the first lens element, the second lens element, the third lens element, the fourth lens element, the fifth lens element, the sixth lens element, and the seventh lens element are respectively negative, negative, positive, positive, negative, positive, and positive, and at least one of the third lens element and the fourth lens element is a freeform surface lens element; and
a convex mirror, configured on an optical path between the lens group and the magnification side, wherein each of the first lens element, the second lens element, the third lens element, the fourth lens element, the fifth lens element, the sixth lens element, and the seventh lens element has a first surface facing the convex mirror and a second surface facing the light valve.

2. The imaging system according to claim 1, wherein the first surface of the third lens element is a freeform surface.

3. The imaging system according to claim 1, wherein the first surface of the fourth lens element is a freeform surface.

4. The imaging system according to claim 1, wherein one of the first surface and the second surface of the first lens element intersects with an optical axis of the lens group at a first intersection point, a first tangent plane is tangent to the one of the first surface and the second surface of the first lens element through the first intersection point, and a first normal vector of the first tangent plane is inclined relative to the optical axis of the lens group.

5. The imaging system according to claim 1, wherein one of the first surface and the second surface of the second lens element intersects with an optical axis of the lens group at a second intersection point, a second tangent plane is tangent to the one of the first surface and the second surface of the second lens element through the second intersection point, and a second normal vector of the second tangent plane is inclined relative to the optical axis of the lens group.

6. The imaging system according to claim 1, wherein one of the first surface and the second surface of the fourth lens element intersects with an optical axis of the lens group at a third intersection point, a third tangent plane is tangent to the one of the first surface and the second surface of the fourth lens element through the third intersection point, and a third normal vector of the third tangent plane is inclined relative to the optical axis of the lens group.

7. The imaging system according to claim 1, wherein the light receiving surface of the light valve is configured to receive an illumination beam, and the illumination beam forms an illumination range on the light receiving surface of the light valve; and there is a fourth intersection point between the light receiving surface of the light valve and an optical axis of the lens group, and there is an offset between a center of the illumination range and the fourth intersection point.

8. The imaging system according to claim 1, wherein there is a distance D between the first surface of the first lens element and a reflective surface of the convex mirror on an optical axis of the lens group, where 1.5 mm<D<5 mm.

9. The imaging system according to claim 1, wherein a reflective surface of the convex mirror has a curvature radius R, where 50 mm<R<110 mm.

10. The imaging system according to claim 1, wherein the projection lens has a maximum height H in a direction perpendicular to an optical axis of the lens group, where H<13.5 mm.

11. The imaging system according to claim 1, wherein an angle of the included angle is θ, where 25°<θ<90°.

12. The imaging system according to claim 1, wherein the light receiving surface of the light valve is configured to receive an illumination beam to convert the illumination beam into the image beam; the image beam sequentially passes through the lens group and is reflected to the projection surface by the convex mirror; the image beam forms an image on the projection surface; two opposite sides of the image are substantially parallel to each other and respectively have a length A and a length B in a direction; and the image has a maximum width W in the direction, where [(B−A)/W]·100%=T and |T|<0.5%.

13. The imaging system according to claim 1, wherein the projection lens further comprises:
an aperture stop, disposed between the first lens element and the second lens element.

14. A projection device, comprising an illumination system and an imaging system, wherein
the illumination system is configured to provide an illumination beam;
the imaging system is configured on a transmission path of the illumination beam, and the imaging system comprises a light valve and a projection lens, wherein
a light receiving surface of the light valve is configured to receive the illumination beam, and the light valve is configured to convert the illumination beam into an image beam, wherein the projection lens is configured to image the image beam from the light valve on a projection surface, and there is an included angle between the projection surface and the light receiving surface of the light valve; and
the projection lens is configured on a transmission path of the image beam and has a reduction side and a magnification side, wherein the light valve is configured on the reduction side of the projection lens, the projection surface is configured on the magnification side of the projection lens, and the projection lens comprises:
a lens group, configured on an optical path between the magnification side and the reduction side, and comprising a first lens element, a second lens element, a third lens element, a fourth lens element, a fifth lens element, a sixth lens element, and a seventh lens element sequentially arranged from the magnification side to the reduction side, wherein refractive powers of the first lens element, the second lens element, the third lens element, the fourth lens element, the fifth lens element, the sixth lens element, and the seventh lens element are respectively negative, negative, positive, positive, negative, positive, and positive, and at least one of the third lens element and the fourth lens element is a freeform surface lens element; and
a convex mirror, configured on an optical path between the lens group and the magnification side, wherein each of the first lens element, the second lens element, the third lens element, the fourth lens element, the fifth lens element, the sixth lens element, and the seventh lens element has a first surface facing the convex mirror and a second surface facing the light valve.

15. The projection device according to claim 14, wherein the first surface of the third lens element is a freeform surface.

16. The projection device according to claim 14, wherein the first surface of the fourth lens element is a freeform surface.

17. The projection device according to claim 14, wherein one of the first surface and the second surface of the first lens element intersects with an optical axis of the lens group at a first intersection point, a first tangent plane is tangent to the one of the first surface and the second surface of the first lens element through the first intersection point, and a first normal vector of the first tangent plane is inclined relative to the optical axis of the lens group.

18. The projection device according to claim 14, wherein one of the first surface and the second surface of the second lens element intersects with an optical axis of the lens group at a second intersection point, a second tangent plane is tangent to the one of the first surface and the second surface of the second lens element through the second intersection point, and a second normal vector of the second tangent plane is inclined relative to the optical axis of the lens group.

19. The projection device according to claim 14, wherein one of the first surface and the second surface of the fourth lens element intersects with an optical axis of the lens group at a third intersection point, a third tangent plane is tangent to the one of the first surface and the second surface of the fourth lens element through the third intersection point, and a third normal vector of the third tangent plane is inclined relative to the optical axis of the lens group.

20. The projection device according to claim 14, wherein the illumination beam forms an illumination range on the light receiving surface of the light valve, there is a fourth intersection point between the light receiving surface of the light valve and an optical axis of the lens group, and there is an offset between a center of the illumination range and the fourth intersection point.

\* \* \* \* \*